(12) United States Patent
Murotani

(10) Patent No.: US 12,417,193 B2
(45) Date of Patent: Sep. 16, 2025

(54) STORAGE CONTROLLER AND STORAGE CONTROLLER CONTROL METHOD

(71) Applicant: Hitachi, Ltd., Tokyo (JP)

(72) Inventor: Tomoya Murotani, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 131 days.

(21) Appl. No.: 18/461,761

(22) Filed: Sep. 6, 2023

(65) Prior Publication Data
US 2024/0403234 A1  Dec. 5, 2024

(30) Foreign Application Priority Data
May 31, 2023  (JP) .................................. 2023-090084

(51) Int. Cl.
  *G06F 13/16*  (2006.01)
  *G06F 13/40*  (2006.01)
(52) U.S. Cl.
  CPC ........ *G06F 13/161* (2013.01); *G06F 13/4022* (2013.01)
(58) Field of Classification Search
  CPC .......................... G06F 13/161; G06F 13/4022
  See application file for complete search history.

(56) References Cited

U.S. PATENT DOCUMENTS

| | | | | |
|---|---|---|---|---|
| 7,360,037 B2 * | 4/2008 | Higaki | ................... | G06F 3/0622 713/310 |
| 2007/0271481 A1 * | 11/2007 | Kawakami | .......... | G06F 11/2092 714/5.11 |
| 2009/0080328 A1 * | 3/2009 | Hu | .......................... | H04L 47/30 370/230 |
| 2011/0264943 A1 * | 10/2011 | Hori | ....................... | G06F 3/0689 713/324 |
| 2012/0137085 A1 * | 5/2012 | Kaneta | ................... | G06F 3/0647 711/E12.002 |
| 2013/0265877 A1 * | 10/2013 | Baker | ................... | G06F 13/362 370/235 |
| 2014/0181804 A1 * | 6/2014 | Sakata | ................... | G06F 9/5088 718/1 |
| 2015/0100821 A1 * | 4/2015 | Sakurai | ............... | G06F 11/1423 714/6.23 |

(Continued)

FOREIGN PATENT DOCUMENTS

JP  2017-010390 A  1/2017

*Primary Examiner* — Faisal M Zaman
(74) *Attorney, Agent, or Firm* — Volpe Koenig

(57) ABSTRACT

To replace a storage controller without stopping a host and without losing data related to IO processing from the host. A storage controller sets, in a port management table, a first host path definition between the host and first address information in a controller unit in addition to a second host path definition between the host and second address information in a controller unit. The storage controller sets, in a route management table, a first connection route between an input port and a first output port to which a port of the first address information is connected, in addition to a second connection route between an input port and a second output port to which a port of the second address information is connected. The storage controller transfers an IO to one controller unit or another controller unit based on the port management table and the route management table.

7 Claims, 23 Drawing Sheets

(56) References Cited

U.S. PATENT DOCUMENTS

| | | | |
|---|---|---|---|
| 2016/0380804 A1* | 12/2016 | Amano | H04L 43/0823 |
| | | | 709/239 |
| 2020/0379857 A1* | 12/2020 | Shah | G06F 11/0757 |
| 2021/0034482 A1* | 2/2021 | Deguchi | G06F 11/2069 |
| 2021/0224001 A1* | 7/2021 | Hosogaya | G06F 12/0246 |
| 2024/0111640 A1* | 4/2024 | Yoshii | G06F 11/0763 |

* cited by examiner

FIG. 2A

PORT MANAGEMENT TABLE 171

| CTL# | Port | Address | LOAD | HOST DEFINITION | LU DEFINITION |
|---|---|---|---|---|---|
| CTL1 (15a) | #9 | WWN#1 | 80MB/s | Host#1 | LU#1, LU#2 |
| | #10 | WWN#2 | 60MB/s | Host#3 | LU#3 |
| | #11 | WWN#3 | 20MB/s | Host#4 | LU#4, LU#5 |
| | #12 | WWN#4 | 20MB/s | Host#5 | LU#6 |
| CTL2 (15b) | #13 | WWN#5 | 0 | UNDEFINED | UNDEFINED |
| | #14 | WWN#6 | 80MB/s | Host#2 | LU#7, LU#8 |
| | #15 | WWN#7 | 0 | UNDEFINED | UNDEFINED |
| | #16 | WWN#8 | 0 | UNDEFINED | UNDEFINED |
| ... | | | | | |

FIG. 2B

ROUTE MANAGEMENT TABLE 131

| Port | STORAGE TARGET WWN | CONNECTION ROUTE | PRESENCE OR ABSENCE OF CONVERSION |
|---|---|---|---|
| #9 | WWN#1 | #1-#9 | |
| #10 | WWN#2 | #2-#10 | |
| #11 | WWN#3 | #3-#11 | |
| #12 | WWN#4 | #4-#12 | |
| #13 | WWN#5 | | |
| #14 | WWN#6 | #6-#14 | |
| #15 | WWN#7 | | |
| #16 | WWN#8 | | |
| ... | | | |

FIG. 2C

OX_ID MANAGEMENT TABLE  132

| Port | OX_ID OF UNCOMPLETED IO | COMPLETION FLAG | DELETABLE |
|---|---|---|---|
| #6 | 00D5 | UNCOMPLETED | NO |
| #6 | 00CA | COMPLETED | YES |
| ... | | | |
| | | | |
| | | | |

FIG. 3B

PORT MANAGEMENT TABLE                                        171

| CTL# | Port | Address | LOAD | HOST DEFINITION | LU DEFINITION | |
|---|---|---|---|---|---|---|
| CTL1 (15a) | #9 | WWN#1 | 80MB/s | Host#1 | LU#1, LU#2 | 1711 |
| | #10 | WWN#2 | 40MB/s | Host#3 | LU#3 | 1712 |
| | #11 | WWN#3 | 20MB/s | Host#4 | LU#4, LU#5 | 1713 |
| | #12 | WWN#4 | 20MB/s | Host#5 | LU#6, LU#7 | 1714 |
| CTL2 (15b) | #13 | WWN#5 | 0 | UNDEFINED | UNDEFINED | |
| | #14 | WWN#6 | 80MB/s | Host#2 | LU#8, LU#9 | 1715 |
| | #15 | WWN#7 | 0 | UNDEFINED | UNDEFINED | |
| | #16 | WWN#8 | 0 | UNDEFINED | UNDEFINED | |
| ... | | | | | | |

FIG. 3C

ROUTE MANAGEMENT TABLE                                       131

| Port | STORAGE TARGET WWN | CONNECTION ROUTE | PRESENCE OR ABSENCE OF CONVERSION | |
|---|---|---|---|---|
| #9 | WWN1 | #1-#9 | | |
| #10 | WWN2 | #2-#10 | | |
| #11 | WWN3 | #3-#11 | | |
| #12 | WWN4 | #4-#12 | | |
| #13 | WWN5 | | | |
| #14 | WWN6 | #6-#14 | | 1311 |
| #15 | WWN7 | | | |
| #16 | WWN8 | | | |
| | | | | |

FIG. 4B

PORT MANAGEMENT TABLE 171

| | Port | Address | LOAD | HOST DEFINITION | LU DEFINITION | |
|---|---|---|---|---|---|---|
| CTL1 | #9 | WWN#1 | 80MB/s | Host#1 | LU#1, LU#2 | |
| | #10 | WWN#2 | 40MB/s | Host#3 | LU#3 | |
| | #11 | WWN#3 | 20MB/s | Host#4 | LU#4, LU#5 | |
| | #12 | WWN#4 | 100MB/s | Host#5 | LU#6, LU#7 | ⎫1717 |
| | #12 | WWN#4⇔WWN#6 | 100MB/s | Host#2 | LU#8, LU#9 | ⎭1716 |
| CTL2 | #13 | WWN#5 | 0 | UNDEFINED | UNDEFINED | |
| | #14 | WWN#6 | 80MB/s | Host#2 | LU#8, LU#9 | ⎬1715 |
| | #15 | WWN#7 | 0 | UNDEFINED | UNDEFINED | |
| | #16 | WWN#8 | 0 | UNDEFINED | UNDEFINED | |
| ... | | | | | | |

FIG. 4C

ROUTE MANAGEMENT TABLE 131

| Port | STORAGE TARGET WWN | CONNECTION ROUTE | PRESENCE OR ABSENCE OF CONVERSION | |
|---|---|---|---|---|
| #9 | WWN1 | #1-#9 | | |
| #10 | WWN2 | #2-#10 | | |
| #11 | WWN3 | #3-#11 | | |
| #12 | WWN4 | #4-#12 | | |
| #12 | WWN#4⇔WWN#6 | #6-#12 | PRESENCE OF CONVERSION | ⎬1312 |
| #13 | WWN5 | | | |
| #14 | WWN6 | #6-#14 | | ⎬1311 |
| #15 | WWN7 | | | |
| #16 | WWN8 | | | |
| | | | | |

FIG. 6B

PORT MANAGEMENT TABLE 171

| | Port | Address | LOAD | HOST DEFINITION | LU DEFINITION | |
|---|---|---|---|---|---|---|
| CTL1 | #9 | WWN#1 | 80MB/s | Host#1 | LU#1, LU#2 | |
| | #10 | WWN#2 | 40MB/s | Host#3 | LU#3 | |
| | #11 | WWN#3 | 20MB/s | Host#4 | LU#4, LU#5 | |
| | #12 | WWN#4 | 100MB/s | Host#5 | LU#6, LU#7 | ⎬1717 |
| | #12 | WWN#4⇔WWN#6 | 100MB/s | Host#2 | LU#8, LU#9 | ⎬1716 |
| CTL2 | #13 | WWN#5 | 0 | UNDEFINED | UNDEFINED | |
| | #14 | WWN#6 | 0 | UNDEFINED | UNDEFINED | ⎬1718 |
| | #15 | WWN#7 | 0 | UNDEFINED | UNDEFINED | |
| | #16 | WWN#8 | 0 | UNDEFINED | UNDEFINED | |
| ... | | | | | | |

FIG. 6C

ROUTE MANAGEMENT TABLE 131

| Port | STORAGE TARGET WWN | CONNECTION ROUTE | PRESENCE OR ABSENCE OF CONVERSION | |
|---|---|---|---|---|
| #9 | WWN1 | #1-#9 | | |
| #10 | WWN2 | #2-#10 | | |
| #11 | WWN3 | #3-#11 | | |
| #12 | WWN4 | #4-#12 | | |
| #12 | WWN#4⇔WWN#6 | #6-#12 | PRESENCE OF CONVERSION | ⎬1312 |
| #13 | WWN5 | | | |
| #14 | WWN6 | | | ⎬1313 |
| #15 | WWN7 | | | |
| #16 | WWN8 | | | |
| | | | | |

FIG. 10B

PORT MANAGEMENT TABLE                    171

| | Port | Address | LOAD | HOST DEFINITION | LU DEFINITION | |
|---|---|---|---|---|---|---|
| CTL1 | #9 | WWN#1 | 80MB/s | Host#1 | LU#1, LU#2 | |
| | #10 | WWN#2 | 60MB/s | Host#3 | LU#3 | |
| | #11 | WWN#3 | 20MB/s | Host#4 | LU#4, LU#5 | ⎬1719 |
| | #12 | WWN#4 | 15MB/s | Host#5 | LU#6 | ⎬1720 |
| CTL2 | #13 | WWN#5 | 0 | UNDEFINED | UNDEFINED | |
| | #14 | WWN#6 | 80MB/s | Host#2 | LU#7, LU#8 | ⎬1721 |
| | #15 | WWN#7 | 0 | UNDEFINED | UNDEFINED | |
| | #16 | WWN#8 | 0 | UNDEFINED | UNDEFINED | |
| ... | | | | | | |

FIG. 10C

ROUTE MANAGEMENT TABLE                    131

| Port | STORAGE TARGET WWN | CONNECTION ROUTE | PRESENCE OR ABSENCE OF CONVERSION | |
|---|---|---|---|---|
| #9 | WWN1 | #1–#9 | | |
| #10 | WWN2 | #2–#10 | | |
| #11 | WWN3 | #3–#11 | | |
| #12 | WWN4 | #4–#12 | | ⎬1314 |
| #13 | WWN5 | | | |
| #14 | WWN6 | #6–#14 | | ⎬1311 |
| #15 | WWN7 | | | |
| #16 | WWN8 | | | |
| ... | | | | |

FIG. 11B

PORT MANAGEMENT TABLE 171

| | Port | Address | LOAD | HOST DEFINITION | LU DEFINITION | |
|---|---|---|---|---|---|---|
| CTL1 | #9 | WWN#1 | 80MB/s | Host#1 | LU#1, LU#2 | |
| | #10 | WWN#2 | 60MB/s | Host#3 | LU#3 | |
| | #11 | WWN#3 | 35MB/s | Host#4 | LU#4, LU#5 | ⎫ 1719 |
| | #11 | WWN#3⇔WWN#4 | 35MB/s | Host#5 | LU#6 | ⎬ 1722 |
| | #12 | WWN#4 | 15MB/s | Host#5 | LU#6 | ⎭ 1720 |
| CTL2 | #13 | WWN#5 | 0 | UNDEFINED | UNDEFINED | ⎫ 1721 |
| | #14 | WWN#6 | 80MB/s | Host#2 | LU#7, LU#8 | ⎬ |
| | #15 | WWN#7 | 0 | UNDEFINED | UNDEFINED | |
| | #16 | WWN#8 | 0 | UNDEFINED | UNDEFINED | |
| ... | | | | | | |

FIG. 11C

ROUTE MANAGEMENT TABLE 131

| Port | STORAGE TARGET WWN | CONNECTION ROUTE | PRESENCE OR ABSENCE OF CONVERSION | |
|---|---|---|---|---|
| #9 | WWN1 | #1-#9 | | |
| #10 | WWN2 | #2-#10 | | |
| #11 | WWN3 | #3-#11 | | |
| #11 | WWN#3⇔WWN#4 | #4-#11 | PRESENCE OF CONVERSION | ⎬ 1315 |
| #12 | WWN4 | #4-#12 | | ⎬ 1314 |
| #13 | WWN5 | | | |
| #14 | WWN6 | #6-#14 | | ⎬ 1311 |
| #15 | WWN7 | | | |
| #16 | WWN8 | | | |
| ... | | | | |

FIG. 13B

PORT MANAGEMENT TABLE 171

| | Port | Address | LOAD | HOST DEFINITION | LU DEFINITION | |
|---|---|---|---|---|---|---|
| CTL1 | #9 | WWN#1 | 80MB/s | Host#1 | LU#1, LU#2 | |
| | #10 | WWN#2 | 60MB/s | Host#3 | LU#3 | |
| | #11 | WWN#3 | 35MB/s | Host#4 | LU#4, LU#5 | ⎤ 1719 |
| | #11 | WWN#3⇔WWN#4 | 35MB/s | Host#5 | LU#6 | ⎤ 1722 |
| | #12 | WWN#4 | 0 | UNDEFINED | UNDEFINED | ⎤ 1723 |
| CTL2 | #13 | WWN#5 | 0 | UNDEFINED | UNDEFINED | |
| | #14 | WWN#6 | 80MB/s | Host#2 | LU#7, LU#8 | ⎤ 1721 |
| | #15 | WWN#7 | 0 | UNDEFINED | UNDEFINED | |
| | #16 | WWN#8 | 0 | UNDEFINED | UNDEFINED | |
| ... | | | | | | |

FIG. 13C

ROUTE MANAGEMENT TABLE 131

| Port | STORAGE TARGET WWN | CONNECTION ROUTE | PRESENCE OR ABSENCE OF CONVERSION | |
|---|---|---|---|---|
| #9 | WWN1 | #1-#9 | | |
| #10 | WWN2 | #2-#10 | | |
| #11 | WWN3 | #3-#11 | | |
| #11 | WWN#3⇔WWN#4 | #4-#11 | PRESENCE OF CONVERSION | ⎤ 1315 |
| #12 | WWN4 | | | ⎤ 1316 |
| #13 | WWN5 | | | |
| #14 | WWN6 | #6-#14 | | ⎤ 1311 |
| #15 | WWN7 | | | |
| #16 | WWN8 | | | |
| ... | | | | |

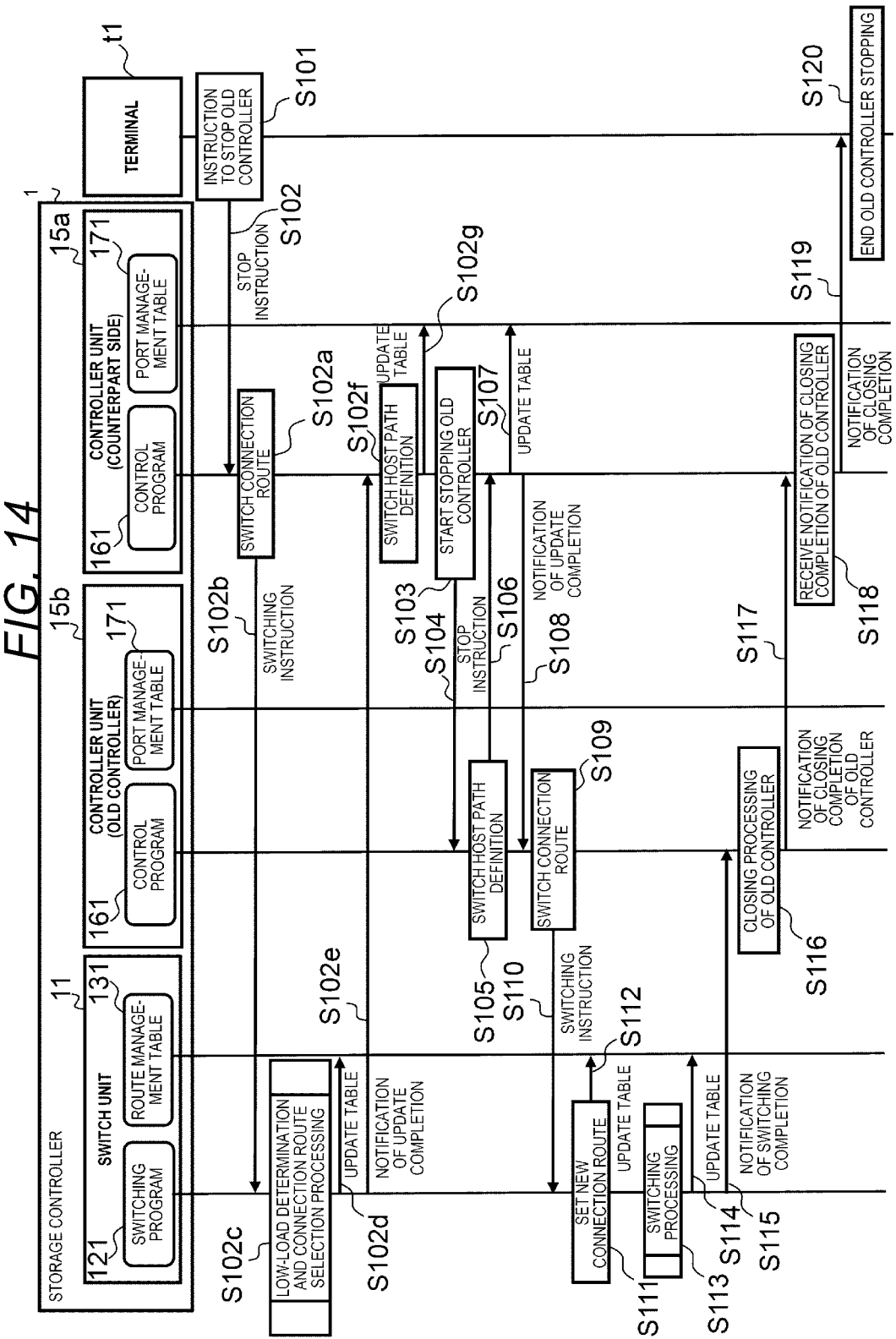

STORAGE CONTROLLER AND STORAGE CONTROLLER CONTROL METHOD

BACKGROUND OF THE INVENTION

1. Field of the Invention

The present invention relates to a storage controller and a storage controller control method.

2. Description of Related Art

In the related art, in a storage device, storage controllers for processing input and output (IO) from a host are redundantly configured. By redundantly configuring a connection between the host and the storage controllers, when an abnormality occurs in one of the storage controllers, IO processing can be continued by another storage controller.

For example, PTL 1 discloses a technique in which, when one of storage control devices redundantly connected to a server device fails, a connection path between the server device and the failed storage control device is switched to a new connection path between the server device and a non-failed storage control device. By switching the connection path in this manner, it is possible to limit an influence of disconnection of the connection path when the failed storage control device is restored by restarting.

CITATION LIST

Patent Literature

PTL 1: JP2017-010390A

SUMMARY OF THE INVENTION

The storage controller may be removed and replaced with a new storage controller for performance improvement and failure replacement. In a storage system in which storage controllers are redundantly connected, by applying the technique disclosed in PTL 1 described above, IO to one failed storage controller can be aggregated in the other non-failed storage controller. In this manner, by replacing the other failed storage controller, the storage controller can be replaced while continuing the IO processing from the host.

However, in the technique disclosed in PTL 1, the storage controller can be replaced while continuing the IO processing from the host, but disconnection may occur when the connection path between the host and the storage controller to be replaced is switched, which causes data related to the IO processing to be lost.

When a connection between a host of a client and the storage controller cannot be redundantly configured, the storage controller cannot be replaced by applying the technique disclosed in PTL 1. That is, after stopping the host, the storage controller is replaced.

The invention is made in view of the above, and an object of the invention is to enable replacement of the storage controller without stopping the host and without losing the data related to the IO from the host.

As one aspect solving the above problems, a storage controller includes a switch unit configured to receive an IO from a host, and a first storage control device and a second storage control device configured to process the IO received by the switch unit and to output and receive data to and from a disc device. The switch unit includes an input port configured to receive the IO from the host, and an output port configured to output the IO to a port of the first storage control device and a port of the second storage control device. A storage unit of the storage controller stores port management information for managing host path definition information for each of the first storage control device and the second storage control device, the host path definition information indicating a correspondence relation between the host and address information held by the port of a transmission destination to which the host transmits the IO, and route management information for managing a connection route for connecting the input port to the output port connected to the port holding the address information in the switch unit to transfer the IO. A processor of the storage controller receives an instruction to stop the second storage control device; converts second address information to first address information, the second address information indicating the address information held by the port of the second storage control device, and the first address information indicating the address information held by the port of the first storage control device; sets, in the port management information, a first host path definition indicating the host path definition information between the host and the first address information in the first storage control device, in addition to a second host path definition indicating the host path definition information between the host and the second address information in the second storage control device; sets, in the route management information, a first connection route indicating the connection route between the input port and a first output port serving as the output port to which the port holding the first address information is connected, in addition to a second connection route indicating the connection route between the input port and a second output port serving as the output port to which the port holding the second address information is connected; and controls the switch unit based on the route management information and controls the first storage control device and the second storage control device based on the port management information to transfer the IO to the first storage control device or the second storage control device.

According to the invention, the storage controller can be replaced without stopping the host and without losing the data related to the IO from the host.

BRIEF DESCRIPTION OF THE DRAWINGS

FIG. 2A is a diagram showing a configuration of a port management table according to Embodiment 1;

FIG. 2B is a diagram showing a configuration of a route management table according to Embodiment 1;

FIG. 2C is a diagram showing a configuration of an OX_ID management table according to Embodiment 1;

FIG. 3B is a diagram showing a state of the port management table according to Embodiment 1;

FIG. 3C is a diagram showing a state of the route management table according to Embodiment 1;

FIG. 4B is a diagram showing a state of the port management table according to Embodiment 1;

FIG. 4C is a diagram showing a state of the route management table according to Embodiment 1;

FIG. 6B is a diagram showing a state of the port management table according to Embodiment 1;

FIG. 6C is a diagram showing a state of the route management table according to Embodiment 1;

FIG. 10B is a diagram showing a state of the port management table according to Embodiment 2;

FIG. 10C is a diagram showing a state of the route management table according to Embodiment 2;

FIG. 11B is a diagram showing a state of the port management table according to Embodiment 2;

FIG. 11C is a diagram showing a state of the route management table according to Embodiment 2;

FIG. 13B is a diagram showing a state of the port management table according to Embodiment 2;

FIG. 13C is a diagram showing a state of the route management table according to Embodiment 2;

FIG. 14 is a sequence diagram showing stop processing of an old storage controller according to Embodiment 2;

DESCRIPTION OF EMBODIMENTS

Figure 1:
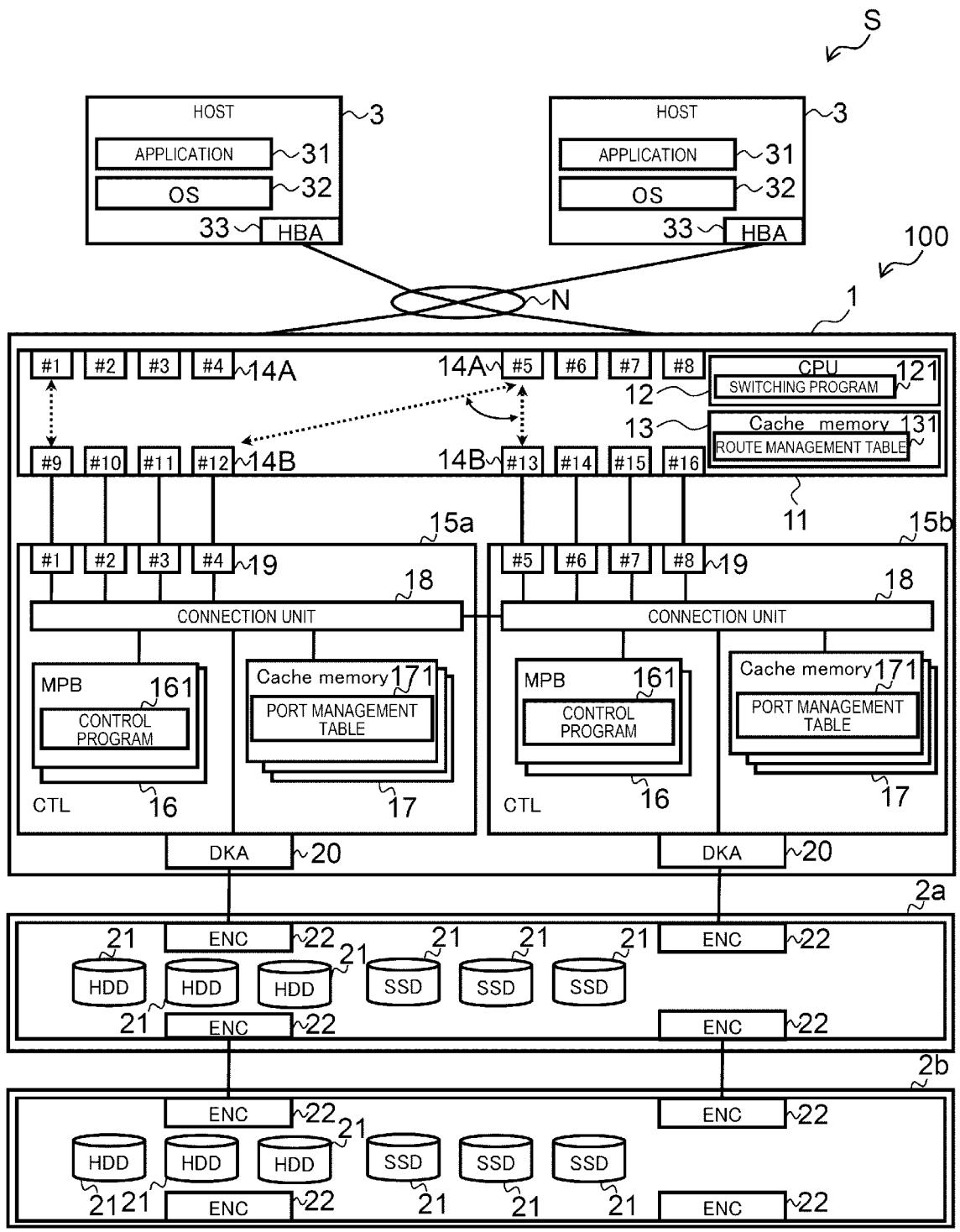
FIG. 1 is a diagram showing a configuration of a storage system according to Embodiment 1.

Hereinafter, embodiments of the invention will be described in detail with reference to the drawings. In the present embodiments, the same components are denoted by the same reference signs in principle, and repeated descriptions thereof are omitted. The present embodiments are merely examples for implementing the invention, and do not limit the technical scope of the invention. The number of components in the present embodiments is not limited unless otherwise noted.

In the following description, reference numerals including indexes are used when the same components are described separately, and a reference numeral excluding the indexes is used when the same components are not described separately. For example, when controller units 15a and 15b are described separately, reference numerals 15a and 15b including indexes a and b are used, and when controller units 15a and 15b are not described separately, a reference numeral 15 excluding the indexes is used.

In the following description, processing performed by a program may be described. A computer performs processing determined by a program using a memory of a main storage device or the like by means of a processor (for example, a central processing unit (CPU) or a graphics processing unit (GPU)). Therefore, a subject of the processing performed by executing the program may be the processor. The processor executes the program to implement a functional unit that performs processing.

Similarly, the subject of the processing performed by executing the program may be a controller, a device, a system, a computing machine, or a node including a processor therein. The subject of the processing performed by executing the program may be a calculation unit and may include a dedicated circuit that performs specific processing. The dedicated circuit is, for example, a field programmable gate array (FPGA) or an application specific integrated circuit (ASIC).

In the following description, the program may be installed in the computing machine from a program source. The program source may be, for example, a program distribution server or a non-transitory storage medium readable by the computing machine. When the program source is the program distribution server, the program distribution server may include a processor and a storage resource (storage) for storing a program to be distributed, and the processor of the program distribution server may distribute the program to be distributed to another computing machine. In the embodiments, two or more programs may be implemented as one program, or one program may be implemented as two or more programs.

In the following description, various types of data will be described in a table format. However, a data format is not limited to the table format, and may be another data format such as a queue, a list, and a comma separated value (CSV). Since the various types of data do not depend on the data format, the " . . . table" can be expressed as " . . . information".

Embodiment 1

In Embodiment 1, IO to a controller to be upgraded (an old generation controller is removed and a new generation controller is inserted) of two controllers is offloaded to a port of the other controller having a lowest load. Then, the controller to be upgraded is stopped, the controller to be upgraded is removed, and an upgraded controller is activated.

In the present embodiment, "IO" refers to transmission of a request and a command for input and output of data from a host to a storage device, and transmission and reception of data between the host and the storage device in response to the request or the command.

Configuration of Storage System S

FIG. 1 is a diagram showing a configuration of a storage system S according to Embodiment 1. The storage system S includes a storage device 100 and hosts 3. The storage device 100 and the hosts 3 are connected via a network N. The network N is a storage area network (SAN) including one or more switches or a communication network including only a connection cable without a network device.

The storage device 100 includes a storage controller 1 and disc devices 2a and 2b. FIG. 1 shows a hierarchical structure in which the disc device 2a is connected to the storage device 100 and the disc device 2b is connected to the disc device 2a. However, the present invention is not limited thereto, and the disc devices 2 in the storage device 100 may have another connection configuration.

The storage controller 1 includes a switch unit 11 and two or more controller units 15a and 15b. The controller unit 15a is an example of a first storage control device. The controller unit 15b is an example of a second storage control device.

The switch unit 11 includes a CPU 12, a cache memory 13, and a plurality of ports 14. The CPU 12 executes a switching program 121. The cache memory 13 is a volatile or nonvolatile storage unit and stores a route management table 131.

The plurality of ports 14 are communication ports for connecting the network N and the controller units 15. The ports 14 include input ports 14A (ports #1 to #8) connected to the network N and output ports 14B (ports #9 to #16) connected to the controller units 15.

The switching program 121 switches connections of the input ports 14A (ports #1 to #8) and the output ports 14B (ports #9 to #16). The switching program 121 manages connection information indicating connection routes of the input ports 14A (ports #1 to #8) and the output ports 14B (ports #9 to #16) in the route management table 131.

The controller unit 15 includes a micro processor package board (MPB) 16, a cache memory 17, a connection unit 18, a plurality of ports 19, and a disc adapter 20. In the present embodiment, the storage controller 1 includes two controller units 15a and 15b.

The MPB 16 is implemented by a board on which a processor such as a CPU and a memory are mounted, and controls the ports 19, the disc adapter 20 and the cache memory 17. The CPU of the MPB 16 executes a control program 161.

The cache memory 17 is a volatile or nonvolatile storage unit, and stores data received from the hosts 3 and data read from the disc devices 2. The cache memory 17 also stores a port management table 171. The controller units 15a and 15b share the port management table 171.

The cache memory 13 of the switch unit 11 and the cache memory 17 of the controller unit 15 are examples of the storage unit in the storage controller 1, and the route management table 131 and the port management table 171 may be arranged in any cache memory.

The connection unit 18 connects the MPB 16, the cache memory 17, the ports 19, and the disc adapter 20 to each other. The connection unit 18 communicates with a connection unit 18 of the other controller unit 15 other than the controller unit 15 in which the connection unit 18 itself is arranged, and causes the controller unit 15 in which the connection unit 18 itself is arranged to access each component of the other controller unit 15. The connection unit 18 can be configured as a high-speed bus such as a crossbar switch that performs data transmission by a high-speed switching operation, for example.

The plurality of ports 19 are communication ports for connection with the switch unit 11. The controller unit 15 performs data communication with an external device via the ports 19. Address information (for example, WWN) for identifying each port 19 in the network N is assigned to each port 19. The address information on the port 19 is a world wide name (WWN) when the network N is a SAN such as a fibre channel, a serial attached SCSI (SAS), or an iSCSI. However, the address information is not limited thereto, and may be any information that can identify the port 19 in the network N.

The disc adapter 20 communicates with the disc device 2 via a communication port (not shown). The disc adapter 20 is configured as a microcomputer including a CPU, a memory, and the like. The disc adapter 20 writes data written to the cache memory 17 to a disc 21 of the disc device 2 via the plurality of ports 19, and writes the data read from the disc 21 to the cache memory 17.

The disc adapter 20 converts a logical address of the data to a physical address when the data is input or output.

The disc device 2 includes a plurality of discs 21 such as hard disc drives (HHD) and solid state drives (SSD) arranged in an array, a flexible disc, and an optical disc, and an I/O interface 22. A magnetic tape or a semi-conductor memory (for example, a flash memory) may be used as the disc 21.

The I/O interface 22 is an interface for communicating with the controller unit 15 or another disc device 2.

The host 3 is a computer device including a host bus adapter 33 and an information processing resource such as a CPU and a memory. The host 3 issues the I/O of the data to the storage device 100 via the host bus adapter by an application 31 running on an operating system (OS) 32 running on the CPU.

In the storage controller 1, the CPU 12 of the switch unit 11 and the CPU mounted in the MPB 16 of the controller unit 15 can communicate with each other, and can refer to the route management table 131 and the port management table 171 as necessary.

The CPU 12 of the switch unit 11 and the CPU mounted in the MPB 16 of the controller unit 15 are examples of a processor in the storage controller 1. Each processing function of the CPU 12 and the CPU mounted on the MPB 16 described in the present embodiment can be appropriately changed in design to be able to be performed by any CPU.

Configuration of Port Management Table 171

FIG. 2A is a diagram showing a configuration of the port management table 171 according to Embodiment 1. The port management table 171 has columns of "CTL #", "Port", "Address", "load", "host definition", and "LU definition".

The "CTL #" is identification n information on the controller unit 15. The "Port" is identification information on the ports 14 (ports #9 to #16) on a controller unit 15 side of the switch unit 11 connected to the port 19 of a corresponding record. The "Address" indicates a WWN of the port 19 identified by the "CTL #" and the "Port".

The "load" indicates a load of the port 19 identified by the "CTL #" and the "Port". The "host definition" is identification information on the host 3 connected to the controller unit 15 via the port 19 identified by the "CTL #" and the "Port". The "LU definition" is identification information in a logical storage area of the disc device 2 connected via the port 19 identified by the "CTL #" and the "Port".

That is, the port management table 171 manages, for each of the controller units 15a and 15b, host path definition information indicating a correspondence relation between the host 3 and the address information (WWN) held by the port 19, which is a transmission destination to which the host 3 transmits the IO.

Configuration of Route Management Table 131

FIG. 2B is a diagram showing a configuration of the route management table 131 according to Embodiment 1. The route management table 131 includes columns of "Port", "storage target WWN", "connection route", and "presence or absence of conversion".

The "Port" is identification information of the output ports 14B (ports #9 to #16). The "storage target WWN" indicates the WWN of the port 19 to which the output port 14B identified by the "Port" is connected. The "storage target "WWN" is blank when the connection between the output port 14B identified by "Port" and the port 19 is not defined.

The "connection route" stores connection information indicating a connection route between the input ports 14A (ports #1 to #8) and the output ports 14B (ports #9 to #16) when the connection route is defined. The "connection route" is blank when the connection route is not defined.

The "presence or absence of conversion" stores "presence of conversion" when the corresponding record indicates the connection route after the conversion of the "storage target WWN" in the switch unit 11, and the "presence or absence of conversion" is blank when the record indicates the connection route before the conversion.

That is, the route management table 131 manages, in the switch unit 11, a connection route for connecting the input port 14A and the output port 14B connected to the port 19 having the address information (WWN) to transfer the IO.

Configuration of OX_ID Management Table 132

FIG. 2C is a diagram showing a configuration of the OX_ID management table 132 according to Embodiment 1. The OX_ID management table 132 is stored in the cache memory 13 of the switch unit 11 and manages an uncompleted IO from the host 3. The OX_ID management table 132 includes columns of "Port", "originator exchange_identifier (OX_ID) of uncompleted IO", "completion flag", and "deletable".

The "Port" indicates identification information of the ports 14 (ports #1 to #8) on a network N side whose connection route to the ports 14 (ports #9 to #16) on the controller unit 15 side is switched during processing of the IO input from the host 3.

The "OX_ID of uncompleted IO" is identification information of the uncompleted IO. As for the "completion flag", "completed" is input when the corresponding uncompleted IO is completed, and "uncompleted" is input when the corresponding uncompleted IO is uncompleted. The "deletable" indicates whether the corresponding record in the OX_ID management table 132 is deletable.

Operation Outline of Storage Controller 1 according to Embodiment 1

FIGS. 3A to 6C are diagrams showing an operation outline of the storage controller 1 and states of the port management table 171 and the route management table 131 at a time of each operation according to Embodiment 1. In Embodiment 1, the controller unit 15b of the controller units 15a and 15b is to be upgraded. That is, the I/O to the controller unit 15b is offloaded to the controller unit 15a to stop the controller unit 15b, the controller unit 15b is upgraded to a controller unit 15b1, and then the controller unit 15b1 is activated.

Before Switching of Connection Route to Controller Unit 15a

Figure 3A:
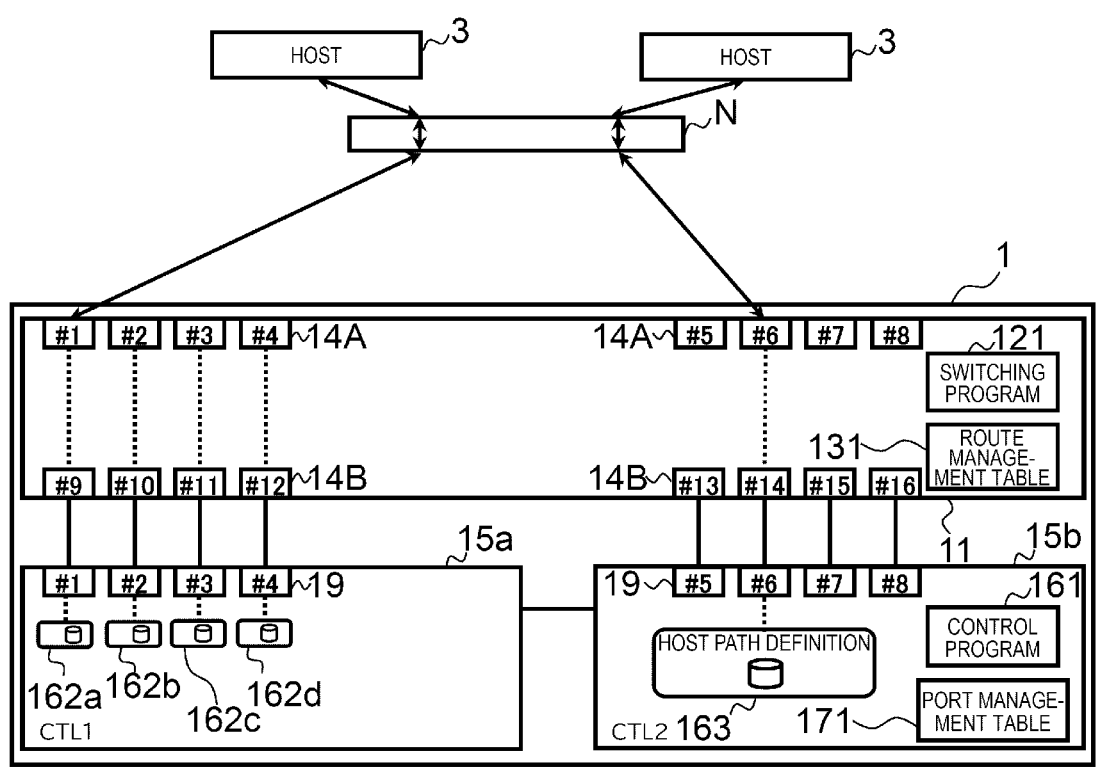
FIG. 3A is a diagram showing a storage controller before switching a connection route to a controller unit according to Embodiment 1.

FIG. 3A is a diagram showing the storage controller 1 before switching the connection route to the controller unit 15a. The port management table 171 before switching the connection route is as shown in FIG. 3B. The route management table 131 before switching the connection route is as shown in FIG. 3C.

In the state shown in FIG. 3A, host path definitions 162a, 162b, 162c, and 162d are defined in the controller unit 15a. A host path definition 163 is defined in the controller unit 15b. Host path definitions 162a, 162b, 162c, 162d, and 163 correspond to records 1711, 1712, 1713, 1714, and 1715 in the port management table 171 (FIG. 3B), respectively.

During Switching Operation (First Half) of Connection Route to Controller Unit 15a according to Embodiment 1

Figure 4A:
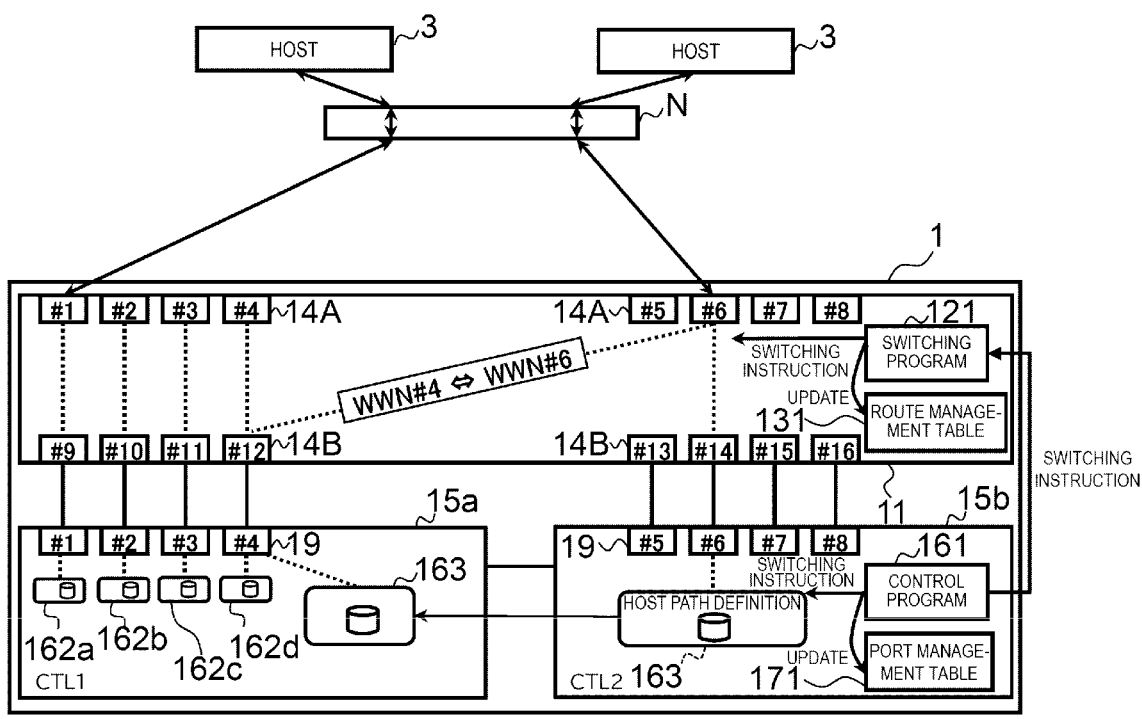
FIG. 4A is a diagram showing the storage controller during a switching operation (first half) of the connection route to the controller unit according to Embodiment 1.

FIG. 4A is a diagram showing the storage controller 1 during the switching operation (first half) of the connection route to the controller unit 15a according to Embodiment 1. The port management table 171 during the switching operation (first half) of the connection route is as shown in FIG. 4B. The route management table 131 during the switching operation (first half) of the connection route is as shown in FIG. 4C.

The control program 161 of the controller unit 15b outputs, to the controller unit 15a, an update instruction for setting the host path definition 163 in the controller unit 15a. The control program 161 of the controller unit 15a sets the host path definition 163 in one of the plurality of ports 19 of the controller unit 15a within a range not exceeding an upper limit of the load of each port 19. In an example of FIG. 4A, the control program 161 of the controller unit 15a sets the host path definition 163 in the port 19 (WWN #4) having a lowest port load among the plurality of ports 19 of the controller unit 15a.

The control program 161 of the controller unit 15a reflects, in the port management table 171, the host path definition 163 additionally set in the controller unit 15a. The host path definition related to the port 19 (WWN #4) to which the host path definition 163 is additionally set corresponds to a record 1716 in the port management table 171 (FIG. 4B).

The "load" of the records 1716 and 1717 is "100 MB/s" because the host path definition 163 related to the record 1715 (FIGS. 3B and 4B) is additionally set to the "WWN #4". "100 MB/s" is the sum of "load" of "20 MB/s" in "WWN #3" and "load" of "80 MB/s" in "WWN #6". In the port management table 171 shown in FIG. 4B, the record 1715 is maintained as in FIG. 3B.

The control program 161 of the controller unit 15b outputs an instruction to switch the connection route to the switching program 121 of the switch unit 11. According to the switching instruction, the switching program 121 additionally sets a connection route (the input port 14A (port #6) to the output port 14B (port #12)) according to the setting of the host path definition 163 to the output port 14B (ports #9 to #12) on the controller unit 15a side. The switch unit 11 transfers the host IO input via the input port 14A (port #6) to the controller unit 15a by the additionally set connection route and WWN conversion (WWN #6 to WWN #4).

After completing the switching of the connection route, the switching program 121 reflects the switching of the connection route in the route management table 131. The connection route related to the port 19 (WWN #4) to which the host path definition 163 is additionally set corresponds to a record 1312 of the route management table 131 (FIG. 4C).

The record 1312 indicates that the connection route related to the record 1311 (FIGS. 3C and 4C) is added as the connection route of the input port 14A (port #6) to the output port 14B (port #12) by the WWN conversion (WWN #6 to WWN #4). Since the record 1312 involves the WWN conversion, the "presence or absence of conversion" is the "presence of conversion". In the route management table 131 shown in FIG. 4C, the record 1311 is maintained as in FIG. 3C.

During Switching Operation (Second Half) of Connection Route to Controller Unit 15a according to Embodiment 1

Figure 5:
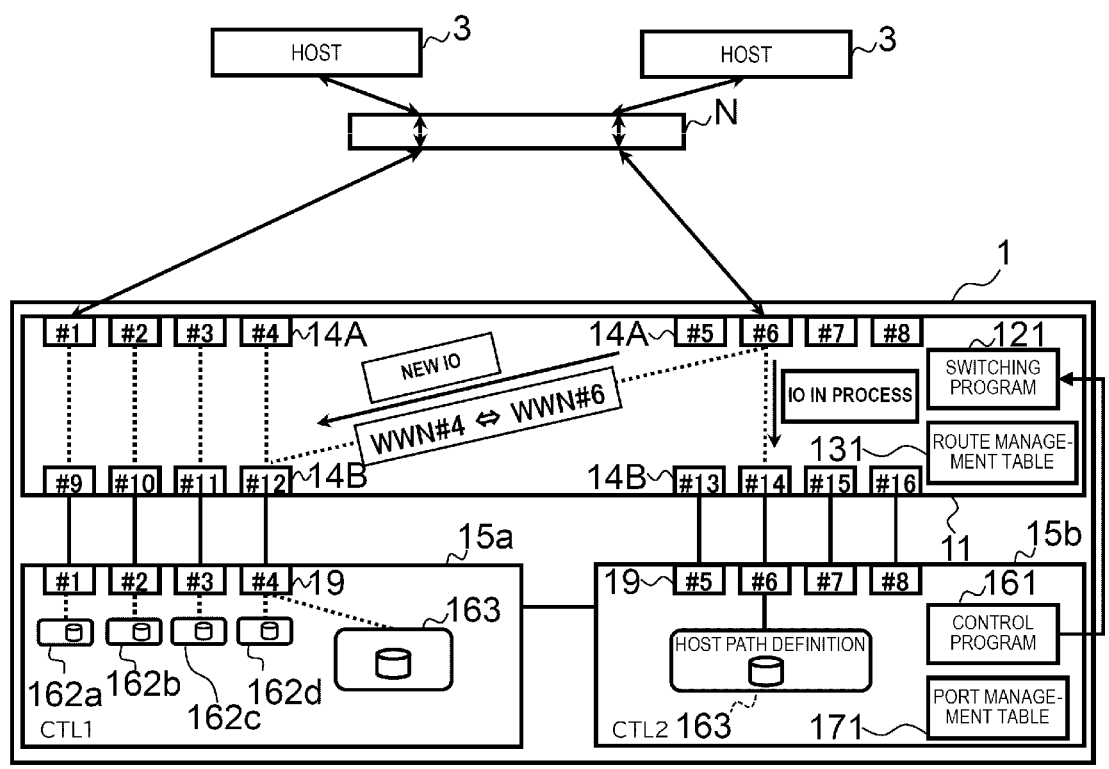
FIG. 5 is a diagram showing the storage controller during the switching operation (second half) of the connection route to the controller unit according to Embodiment 1.

FIG. 5 is a diagram showing the storage controller 1 during the switching operation (second half) of the connection route to the controller unit 15a according to Embodiment 1.

FIG. 5 shows that an IO (new IO) newly input from the input port 14A (port #6) after the start of the switching operation of the connection route to the controller unit 15a shown in FIG. 4A is allocated to the controller unit 15a for processing. The connection route when the IO is allocated to the controller unit 15a is from the input port 14A (port #6) to the output port 14B (port #12).

FIG. 5 shows that an I/O (IO in process), in which the processing input from the input port 14A (port #6) before the start of the switching operation of the connection route to the controller unit 15a shown in FIG. 4A is uncompleted, is allocated to the controller unit 15b for processing. The connection route when the IO is allocated to the controller unit 15b is from the input port 14A (port #6) to the output port 14B (port #14).

After Completing Switching Operation of Connection Route to Controller Unit 15a according to Embodiment 1

Figure 6A:
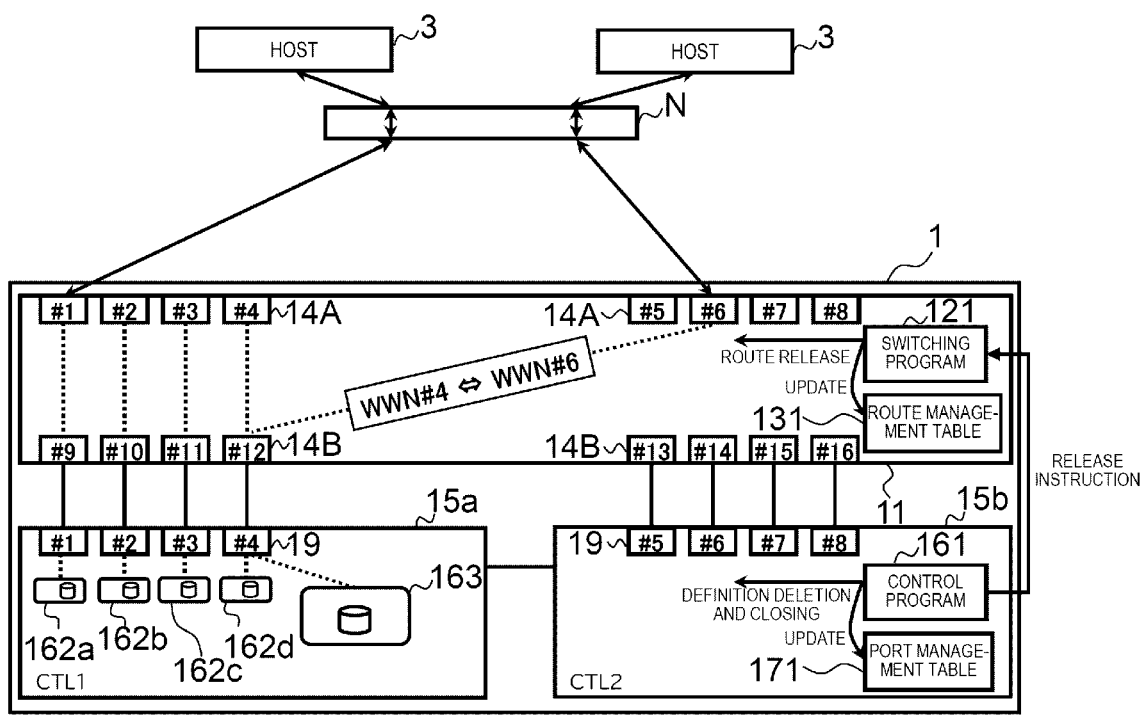
FIG. 6A is a diagram showing the storage controller after completion of the switching operation of the connection route to the controller unit according to Embodiment 1.

FIG. 6A is a diagram showing the storage controller 1 after completing the switching operation of the connection route to the controller unit 15a according to Embodiment 1. FIG. 5 shows the storage controller 1 in a state in which all the I/Os in process are allocated to the controller unit 15b and processing is completed.

The port management table 171 after the switching operation of the connection route is completed is as shown in FIG. 6B. The route management table 131 after the switching operation of the connection route is completed is as shown in FIG. 6C.

In the state shown in FIG. 6A, the control program 161 of the controller unit 15b executes definition deletion of deleting the host path definition 163 in the controller unit 15b, and reflects the deletion in the port management table 171. The host path definition related to the port 19 (WWN #6) from which the host path definition 163 is deleted corresponds to the record 1718 in the port management table 171 (FIG. 6B). As shown in the record 1718, the host path definition 163 related to the record 1715 (FIGS. 3B and 4B) is clear such that the "load" is "0", and the "host definition" and the "LU definition" are "undefined". Thereafter, the control program 161 of the controller unit 15b closes (shuts down) the controller unit 15b.

The control program 161 of the controller unit 15b outputs an instruction to release the connection route to the switching program 121 of the switch unit 11. The switching program 121 deletes the connection route (the input port 14A (port #6) to the output port 14B (port #14)) according to the deletion of the host path definition 163 in accordance with the release instruction. Thereafter, the switch unit 11 transfers the host IO input via the input port 14A (port #6) to only the controller unit 15a through the connection route (the input port 14A (port #6) to the output port 14B (port #12)).

The control program 161 reflects the release of the connection route in the route management table 131. The released connection route corresponds to the record 1313 in the route management table 131 (FIG. 6C). As shown in the record 1313, the connection route related to the record 1311 (FIGS. 3C and 4C) is clear such that the "connection route" and the "presence or absence of conversion" are blank.

Stop Processing Sequence of Old Controller according to Embodiment 1

Figure 7:
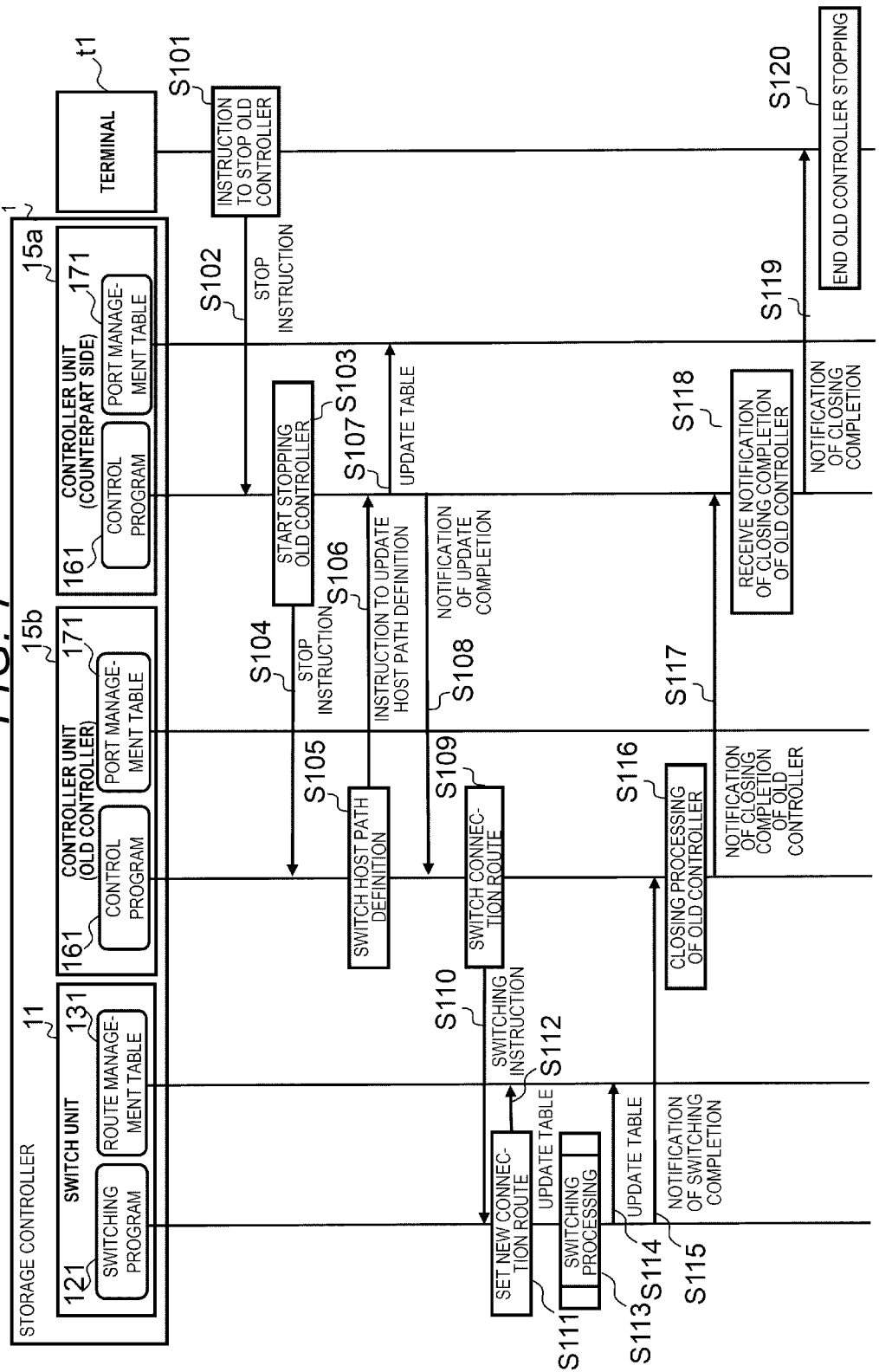
FIG. 7 is a sequence diagram showing stop processing of an old controller according to Embodiment 1.

FIG. 7 is a sequence diagram showing stop processing of an old controller according to Embodiment 1.

First, in step S101, a terminal t1 capable of communicating with the storage controller 1 via the network N receives an instruction to stop the old controller from an operator. In the present embodiment, the old controller to be upgraded is the controller unit 15b. Next, in step S102, the terminal t1 transmits the received instruction to stop the old controller to the control program 161 of the controller unit 15a on the counterpart side of the old controller.

Next, in step S103, the control program 161 of the controller unit 15a on the counterpart side starts stopping the old controller. Next, in step S104, the control program 161 of the controller unit 15a transmits the instruction to stop the old controller to the control program 161 of the controller unit 15b.

Next, in step S105, the control program 161 of the controller unit 15b starts switching the host path definition 163. Next, in step S106, the control program 161 of the controller unit 15b transmits an instruction to update the host path definition 163 to the control program 161 of the controller unit 15a.

Next, in step S107, the control program 161 of the controller unit 15a sets, in the controller unit 15a, the host path definition 163 in the port management table 171 in response to the update instruction of the host path definition 163. Specifically, as shown in FIG. 4B, the port 19 (WWN #4) having the lowest load of the controller unit 15a is selected. The record 1716 in which the host path definition 163 of the record 1715 (FIG. 3B) is set in the record 1714 (FIG. 3B) is generated such that the host path definition 163 is set in the selected port 19, and the "load" of the record 1717 is updated.

Next, in step S108, the control program 161 of the controller unit 15a notifies the control program 161 of the controller unit 15b of completion of table update in step S107.

Next, in step S109, the control program 161 of the controller unit 15b executes connection route switching in the switch unit 11. Next, in step S110, the control program 161 of the controller unit 15b transmits the instruction to switch the connection route in the switch unit 11 to the switch unit 11.

Next, in step S111, the switching program 121 of the switch unit 11 sets a new connection route in response to the instruction to switch the connection route. Next, in step S112, the switching program 121 of the switch unit 11 reflects information of the new connection route in the route management table 131. Specifically, as shown in FIG. 4C, the record 1312 is generated in the route management table 131.

Next, in step S113, the switching program 121 of the switch unit 11 executes switching processing. Details of the switching processing will be described later with reference to FIG. 8.

Next, in step S114, the switching program 121 of the switch unit 11 deletes an existing connection route that overlaps between the connection route newly set in step S111 and the host 3 of an IO source. Specifically, in the route management table 131, the "connection route" and the "presence or absence of conversion" of the record 1311 having the same WWN before conversion of the record 1312 with the "presence of conversion" for the "presence or absence of conversion" shown in FIG. 4C are cleared as in the record 1313 shown in FIG. 6C.

Next, in step S115, the switching program 121 of the switch unit 11 transmits a notification of switching completion of the connection route to the control program 161 of the controller unit 15b.

Next, in step S116, the control program 161 of the controller unit 15b executes closing processing of the controller unit 15b. Next, in step S117, the control program 161 of the controller unit 15b notifies the control program 161 of the controller unit 15a of closing completion of the controller unit 15b.

Next, in step S118, the control program 161 of the controller unit 15a receives the notification of closing completion of the controller unit 15b from the control program 161 of the controller unit 15b. Next, in step S119, the control program 161 of the controller unit 15a notifies the terminal t1 of the closing completion of the controller unit 15b.

Next, in step S120, the terminal t1 outputs the closing completion of the controller unit 15b to a display screen or the like, and ends the stop processing of the old controller.

Switching Processing According to Embodiment 1

Figure 8:
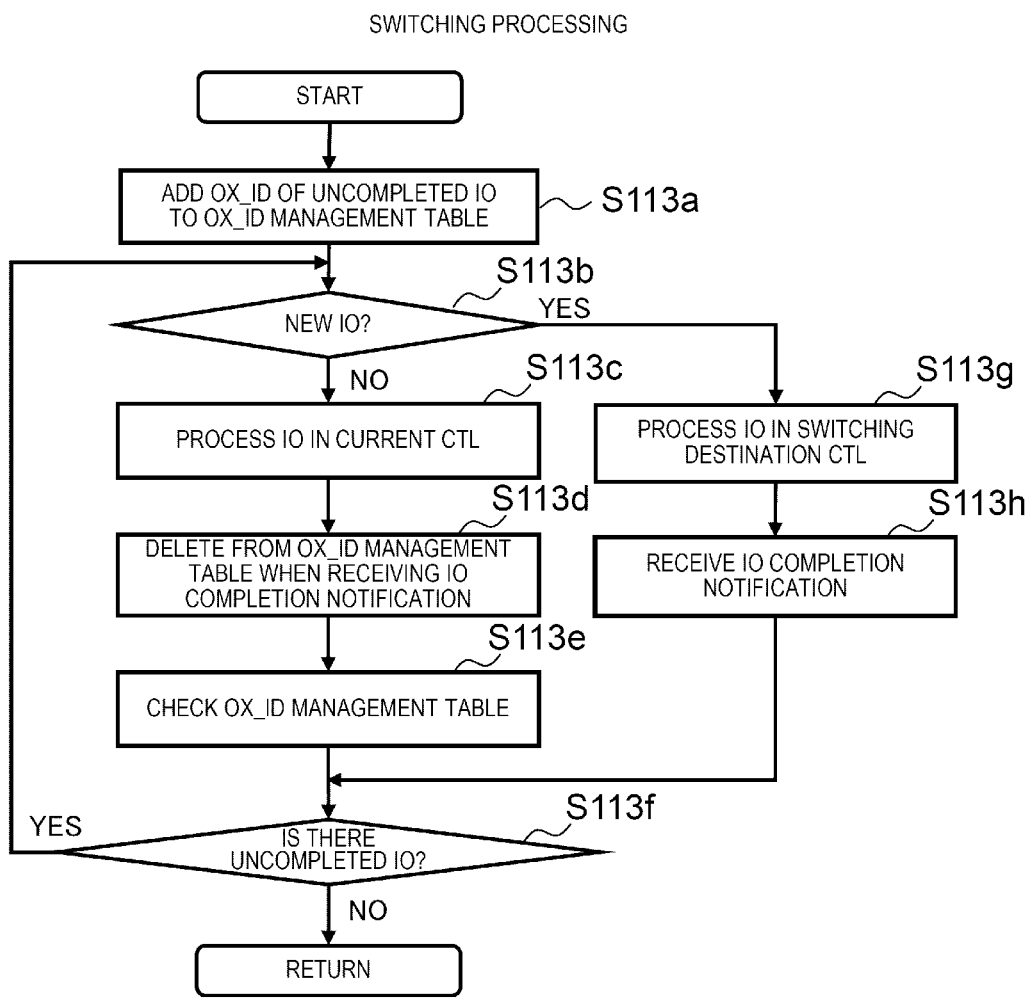
FIG. 8 is a flowchart showing switching processing according to Embodiment 1.

FIG. 8 is a flowchart showing the switching processing (step S113 (FIG. 7)) according to Embodiment 1.

First, in step S113a, the switching program 121 of the switch unit 11 adds the OX_ID of the uncompleted IO currently being processed to the OX_ID management table 132 (FIG. 2C). Next, in step S113b, the switching program 121 determines whether the input IO is a new IO. The switching program 121 proceeds the processing to step S113g if the input IO is a new IO (YES in step S113b), and proceeds the processing to step S113c if the input IO is an uncompleted IO (NO in step S113b).

In step S113c, the switching program 121 processes the uncompleted IO in a current controller before the switching. The current controller is the controller unit 15b when the switching processing is executed in the stop processing of the old controller in FIG. 7.

Next, in a step S113d, when receiving the IO completion notification of the uncompleted IO from the current controller, the switching program 121 deletes the OX_ID of the uncompleted IO from the OX_ID management table 132.

Next, in step S113e, the switching program 121 checks whether there is the OX_ID of the uncompleted IO in the OX_ID management table 132. Next, in step S113f, when there is the OX_ID of the uncompleted IO in the OX_ID management table 132 (YES in step S113f), the switching program 121 returns the processing to step S113b. On the other hand, when there is no OX_ID of the uncompleted IO (NO in step S113f), the switching processing ends, and the processing proceeds to step S114 (FIG. 7).

On the other hand, in step S113g, the switching program 121 processes the uncompleted IO in a switching destination controller. The switching destination controller is the controller unit 15a when the switching processing is executed in the stop processing of the old controller in FIG. 7.

Next, in step S113h, the switching program 121 receives the IO completion notification. When the step S113h ends, the switching program 121 proceeds the processing to step S113f.

Activation Processing Sequence of New Controller according to Embodiment 1

Figure 9:
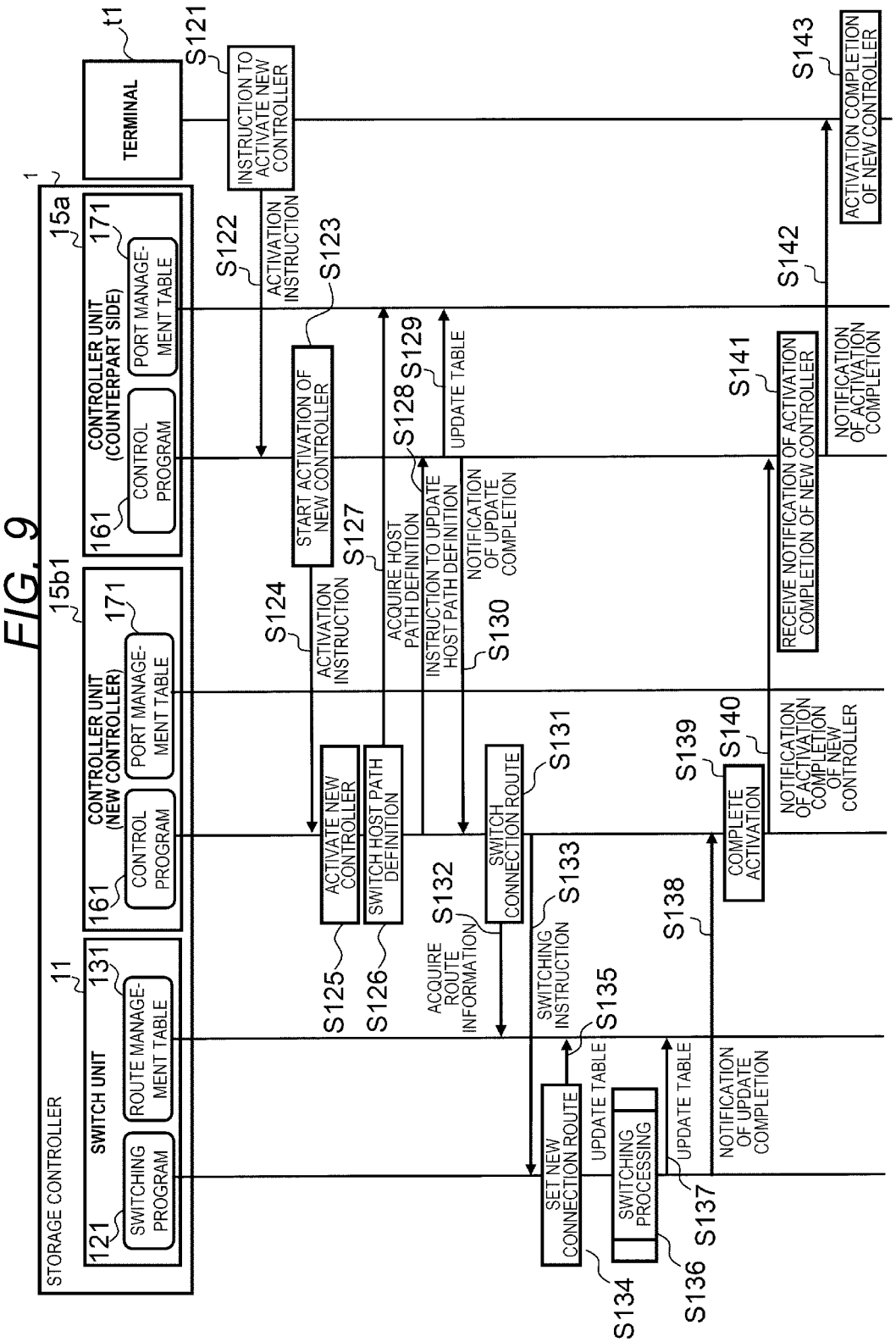
FIG. 9 is a sequence diagram showing activation processing of a new controller according to Embodiment 1.

FIG. 9 is a sequence diagram showing activation processing of the new controller according to Embodiment 1. The activation processing of the new controller is executed after the old controller is upgraded to the controller unit 15b1 after ending the stop processing of the old controller (FIG. 7).

First, in step S121, the terminal t1 receives an instruction to activate the new controller from the operator. In the present embodiment, the new controller is the controller unit 15b1. Next, in step S122, the terminal t1 transmits the received instruction to activate the new controller to the control program 161 of the controller unit 15a on the counterpart side of the new controller.

Next, in step S123, the control program 161 of the controller unit 15a on the counterpart side starts the activation of the new controller. Next, in step S124, the control program 161 of the controller unit 15a transmits the instruction to activate the new controller to the control program 161 of the controller unit 15b1.

Next, in step S125, the control program 161 of the controller unit 15b1 activates the controller unit 15b1 serving as the new controller. In step S126, the control program 161 of the controller unit 15b1 starts switching the host path definition 163. Here, as shown in FIG. 6A, the host path definition 163 to be switched is the host path definition 163 that is moved from the controller unit 15b to the controller unit 15a.

Next, in step S127, the control program 161 of the controller unit 15b1 acquires the host path definition 163 from the port management table 171. Next, in step S128, the control program 161 of the controller unit 15b1 transmits an instruction to update the host path definition 163 to the control program 161 of the controller unit 15a.

Next, in step S129, the control program 161 of the controller unit 15a sets the host path definition 163 to the controller unit 15b1 in the port management table 171 in response to the instruction to update the host path definition 163. That is, the port management table 171 is updated such that the host path definition 163 moved from the controller unit 15b to the controller unit 15a in step S107 in the stop processing of the old controller in FIG. 7 is returned from the controller unit 15a to the controller unit 15b1. Specifically, the port management table 171 is updated from the state in FIG. 6B to the state in which the record 171S in FIG. 4B is restored.

Next, in step S130, the control program 161 of the controller unit 15a notifies the control program 161 of the controller unit 15b1 of the completion of the table update in step S129.

Next, in step S131, the control program 161 of the controller unit 15b1 executes the connection route switching in the switch unit 11. Next, in step S132, the control program 161 of the controller unit 15b1 acquires the corresponding record with the "presence of conversion" for the "presence or absence of conversion" in the route management table 131 from the switch unit 11 as route information.

Next, in step S133, the control program 161 of the controller unit 15b1 transmits, to the switch unit 11, the instruction to switch the connection route in the switch unit 11 based on the route information acquired in step S132.

Next, in step S134, the switching program 121 of the switch unit 11 sets the new connection route in response to the instruction to switch the connection route. The new connection route set here is, for example, the connection route indicated by the record 1311 in the route management table 131 shown in FIG. 4C obtained by restoring the record 1313 in the route management table 131 shown in FIG. 6C to the state before the switching processing.

Next, in step S135, the switching program 121 of the switch unit 11 reflects the information of the new connection route set in step S134 in the route management table 131. Specifically, the record 1311 is generated in the route management table 131 shown in FIG. 4C.

Next, in step S136, the switching program 121 of the switch unit 11 executes the switching processing. Details of the switching processing in step S136 are the same as those in step S113. In the switching processing in step S136, the current controller is the controller unit 15a, and the switching destination controller is the controller unit 15b1.

Next, in step S137, the switching program 121 of the switch unit 11 deletes an existing connection route that overlaps between the connection route newly set in step S134 and the host 3 of the IO source in the route management table 131. Specifically, the record 1312 is deleted in the route management table 131 shown in FIG. 4C.

Next, in step S138, the switching program 121 of the switch unit 11 transmits the notification of switching completion of the connection route to the control program 161 of the controller unit 15b.

Next, in step S139, the control program 161 of the controller unit 15b1 receives the notification of switching completion from the switching program 121 of the switch unit 11, and completes the activation of the controller unit 15b. In step S140, the control program 161 of the controller unit 15b1 notifies the control program 161 of the controller unit 15a of activation completion of the controller unit 15b1.

Next, in step S141, the control program 161 of the controller unit 15a receives the activation completion of the controller unit 15b1 from the control program 161 of the controller unit 15b1. Next, in step S142, the control program 161 of the controller unit 15a notifies the terminal t1 of the activation completion of the controller unit 15b1.

Next, in step S143, the terminal t1 outputs the activation completion of the controller unit 15b1 to the display screen or the like, and ends the activation processing of the new controller.

Effects of Embodiment 1

In Embodiment 1 described above, a second host path definition between second address information in the controller unit 15b to be updated and the host 3 is set in the port management table 171. Further, a first host path definition between first address information in the controller unit 15a and the host 3 is set in the port management table 171. A second connection route between the input port 14A and a second output port serving as the output port 14B to which the port 19 having the second address information is connected, is set in the route management table 131. Further, a first connection route between the input port 14A and a first output port serving as the output port 14B to which the port 19 having the first address information is connected, is set in the route management table 131. In this way, the WWN address is converted, and the connection route and the host path definition information are double set such that the IO to one controller unit 15 is transferred to both controller units 15. According to the port management table 171 and the route management table 131, the IO is transferred to the controller unit 15a or 15b.

Thus, according to Embodiment 1, the storage controller 1 of the storage device 100 includes the controller unit 15 including a redundant configuration and an interface capable of switching the connection route. Storage target information (WWN) visible from the host 3 is maintained by switching the connection route by the interface. As a result, the controller unit 15 can be upgraded without stopping the host 3 and deleting the data related to the IO from the host 3.

In Embodiment 1 described above, identification information of the IO in process is recorded in the OX_ID management table 132, and it is determined whether the identification information of the IO is recorded in the OX_ID management table 132 for each IO. When the identification information of the IO is recorded in the OX_ID management table 132, the IO in process is output to the controller unit 15b via the second connection route. When the identification information of the IO is not recorded in the OX_ID management table 132, the new IO is output to the controller unit 15a via the first connection route.

Thus, according to Embodiment 1, it is possible to avoid the occurrence of instantaneous interruption of the IO by distinguishing between the new IO and the IO in process and switching the controller unit 15 of the transfer destination.

Embodiment 2

In Embodiment 2, before the IO to the controller to be upgraded is offloaded to another controller, the IO is aggregated in advance in the other controller to create a free resource. In this way, the IO to the controller to be upgraded is moved to the free resource ensured, thereby preventing a migration load from becoming excessive.

In the description of Embodiment 2, repeated description with Embodiment 1 will be omitted, and differences from Embodiment 1 will be mainly described.

Operation Outline of Storage Controller 1B according to Embodiment 2

FIGS. 10A to 13C are diagrams showing an operation outline of the storage controller 1 according to Embodiment 2 and states of the port management table 171 and the route management table 131 at a time of each operation. In Embodiment 2, IO connection paths are aggregated in the controller unit 15a on the counterpart side of the controller unit 15b to be upgraded to create the free resource of the port 19. The IO to the controller unit 15b is offloaded to the free resource of the controller unit 15a to stop the controller unit 15b, the controller unit 15b is upgraded to a controller unit 15b1, and then the controller unit 15b1 is activated.

Figure 10A:
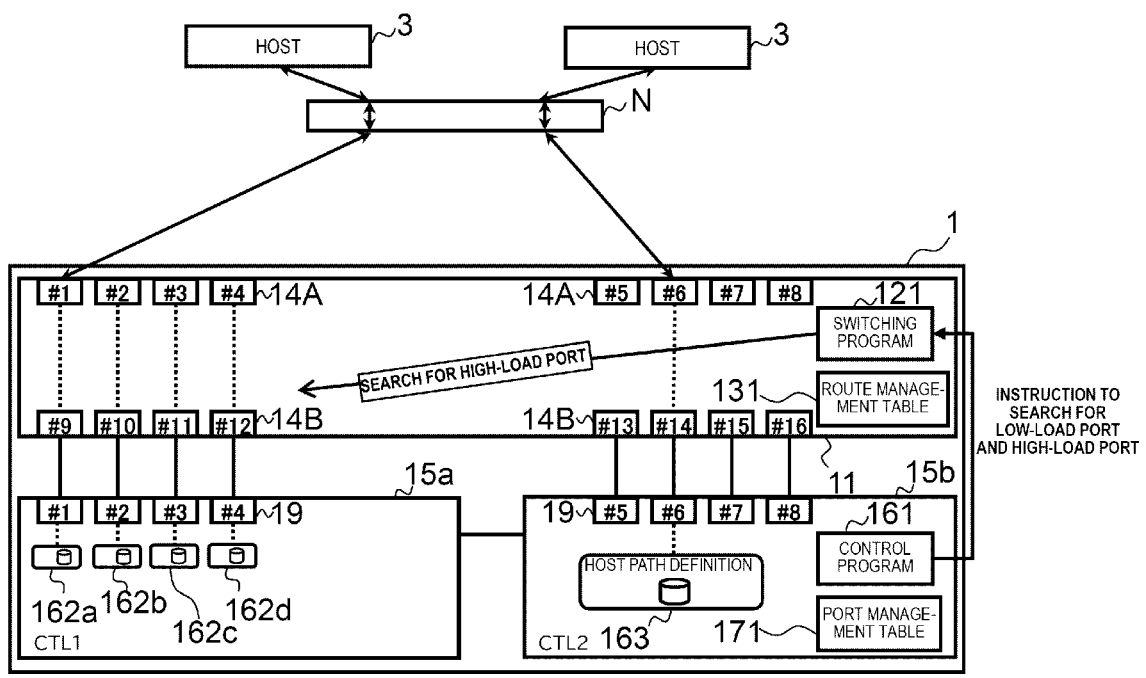
FIG. 10A is a diagram showing the storage controller before switching a connection route to the controller unit according to Embodiment 2.

FIG. 10A is a diagram showing the storage controller 1 before switching the connection route of the controller unit 15. The port management table 171 before switching the connection route is as shown in FIG. 10B. The route management table 131 before switching the connection route is as shown in FIG. 10C.

In a state shown in FIG. 10A, the control program 161 of the controller unit 15b outputs, to the switching program 121 of the switch unit 11, a low-load port search instruction to search for a low-load port of the counterpart controller unit 15a. The control program 161 of the controller unit 15a specifies a plurality of (for example, two) ports having the lowest load among the plurality of ports 19 of the controller unit 15a. In an example of FIG. 10A, it is assumed that the control program 161 of the controller unit 15a specifies the port 19 (WWN #4) of the controller unit 15a as a low-load port having the lowest load. Further, it is assumed that the port 19 (WWN #3) of the controller unit 15a is specified as a low-load port having a second lowest load.

During Switching Operation (First Half) of Connection Route in Controller Unit 15a according to Embodiment 2

Figure 11A:
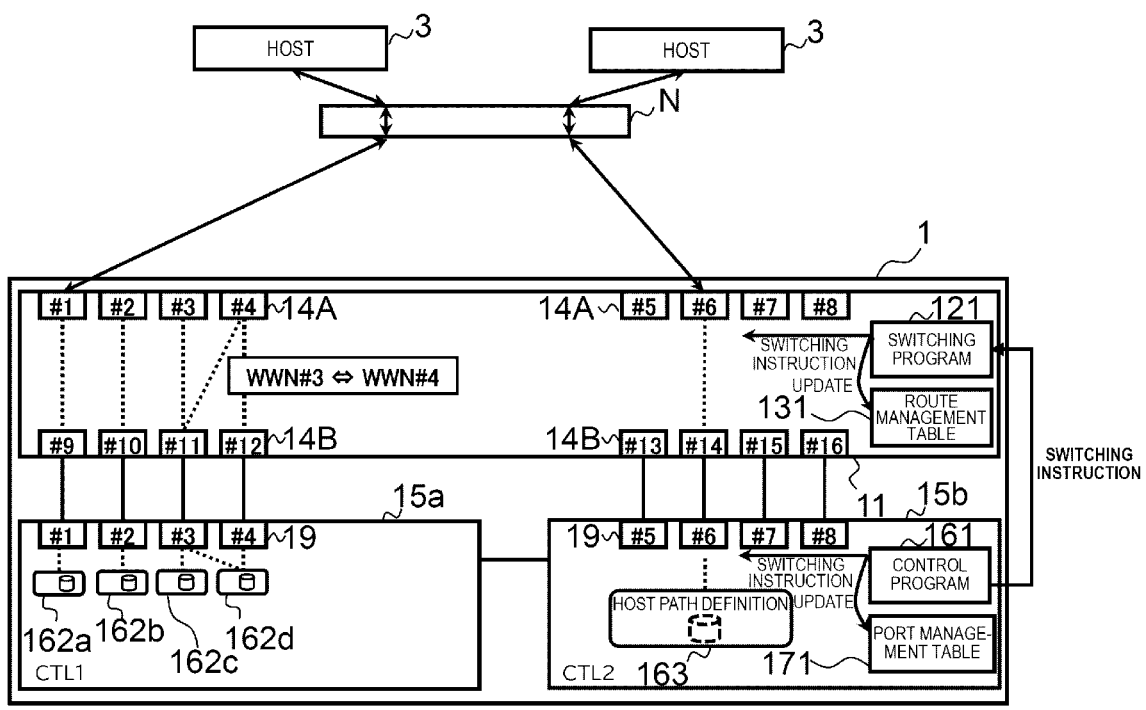
FIG. 11A is a diagram showing the storage controller during a switching operation (first half) of a connection route in the controller unit according to Embodiment 2.

FIG. 11A shows the switching operation (first half) of the connection route in the controller unit 15a according to Embodiment 2. The port management table 171 during the aggregation of the connection routes of the controller unit 15a is as shown in FIG. 11B. The route management table 131 during the aggregation of the connection routes of the controller unit 15a is as shown in FIG. 11C.

As shown in FIG. 11A, the control program 161 of the controller unit 15a additionally sets, to the port 19 (WWN #3) having the second lowest load of the controller unit 15a, the host path definition 162d related to the port 19 (WWN #4) having the lowest load.

The control program 161 of the controller unit 15a reflects, in the port management table 171, the host path definition 162d additionally set in the controller unit 15a. The host path definition related to the port 19 (WWN #3) to which the host path definition 162*d* is additionally set corresponds to the record 1722 in the port management table 171 (FIG. 11B).

The "load" of the records 1719 and 1722 is "35 MB/s" because the host path definition 162*d* related to the record 1720 (FIGS. 10B and 11B) is additionally set to "WWN #3". "35 MB/s" is the sum of the "load" of the "WWN #3" of "20 MB/s" and the "load" of the "WWN #4" of "15 MB/s". In the port management table 171 shown in FIG. 10B, the record 1719 is maintained as in FIG. 10B.

The control program 161 of the controller unit 15*b* outputs an instruction to switch the connection route to the switching program 121 of the switch unit 11. In accordance with the switching instruction, the switching program 121 additionally sets a connection route (the input port 14A (port #4) to the output port 14B (port #11)) according to the setting of the host path definition 162*d* to the output port 14B (port #11) on the controller unit 15*a* side. The switch unit 11 outputs the IO input via the input port 14A (port #4) to the port 19 (WWN #3) of the controller unit 15*a* via the output port 14B (port #11) by the additionally set connection route and WWN conversion (WWN #4 to WWN #3).

After completing the switching of the connection route, the switching program 121 reflects the switching of the connection route in the route management table 131. The connection route related to the port 19 (WWN #3) to which the host path definition 162*d* is additionally set corresponds to the record 1315 in the route management table 131 (FIG. 11C).

The record 1315 indicates that the connection route related to the record 1314 (FIG. 10C) is added as a connection route of the input port 14A (port #4) to the output port 14B (port #11) by the WWN conversion (WWN #4 to WWN #3) in the switch unit 11. Since the record 1315 involves the WWN conversion, the "presence or absence of conversion" is the "presence of conversion". In the route management table 131 shown in FIG. 11C, the record 1314 is maintained as in FIG. 10C.

During Switching Operation (Second Half) of Connection Route in Controller Unit 15*a* according to Embodiment 2

Figure 12:
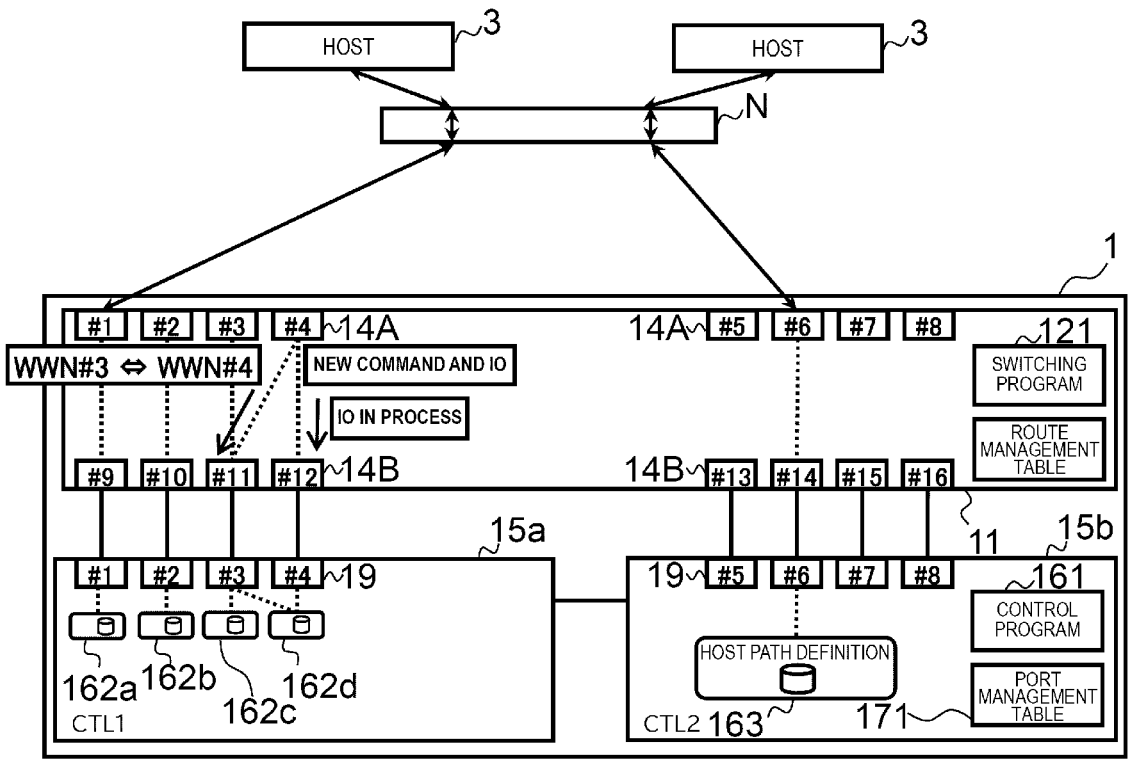
FIG. 12 is a diagram showing the storage controller during the switching operation (second half) of the connection route in the controller unit according to Embodiment 2.

FIG. 12 is a diagram showing the storage controller 1 during the switching operation (second half) of the connection route in the controller unit 15*a* according to Embodiment 2.

FIG. 12 shows that a command and an IO newly input from the input port 14A (port #4) after the start of the aggregation processing of the connection routes in the controller unit 15*a* shown in FIG. 11A are input to the controller unit 15*a* and processed. The connection route when being input to the controller unit 15*a* is from the input port 14A (port #4) to the output port 14B (port #11).

FIG. 12 shows that a command and an IO that are in process and that are input from the input port 14A (port #4) before the start of the aggregation processing of the connection route in the controller unit 15*a* shown in FIG. 11A are input to the controller unit 15*a* and processed. The connection route when being input to the controller unit 15*a* is the input port 14A (port #4) to the output port 14B (port #12).

Storage Controller 1 after Switching Operation of Connection Route according to Embodiment 2

Figure 13A:
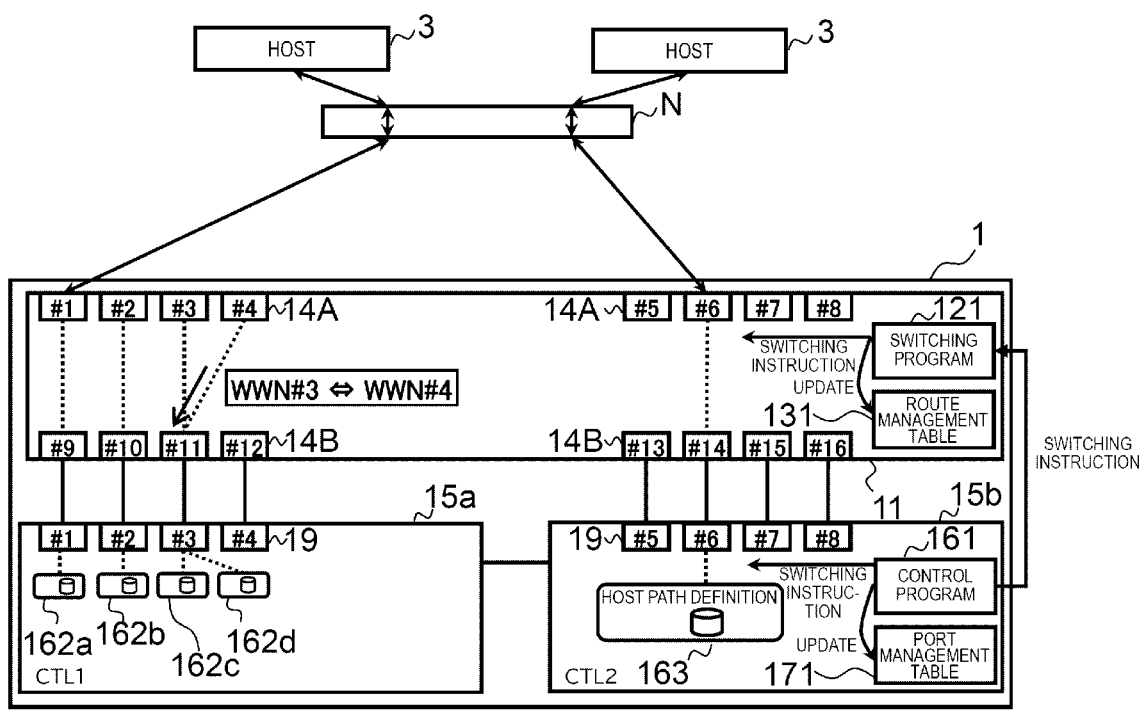
FIG. 13A is a diagram showing a storage controller 1 after the switching operation of the connection route in the controller unit according to Embodiment 2.

FIG. 13A is a diagram showing the storage controller 1 after the switching operation of the connection route according to Embodiment 2. FIG. 13A shows the storage controller 1 in a state in which all the IOs in process input via the input port 14A (port #4) are allocated to the controller unit 15*b* and the processing is completed.

The port management table 171 after the switching operation of the connection route of the controller unit 15*a* is as shown in FIG. 13B.

In the state shown in FIG. 13A, the control program 161 of the controller unit 15*b* executes definition deletion of deleting the host path definition 162*d* connected to the port 19 (WWN #4) in the controller unit 15*a*, and reflects the deletion in the port management table 171. The host path definition related to the port 19 (WWN #4) from which the host path definition 162*d* connected to the port 19 (WWN #4) is deleted corresponds to the record 1723 in the port management table 171 (FIG. 13B). As shown in the record 1723, the host path definition 162*d* related to the record 1720 (FIGS. 10B and 11B) is clear such that the "load" is "0", and the "host definition" and the "LU definition" are "undefined".

The route management table 131 after the aggregation of the connection routes of the controller unit 15*a* is as shown in FIG. 13C.

The control program 161 reflects the release of the connection routes from the input port 14A (port #4) to the output port 14B (port #12) in the route management table 131. The released connection route corresponds to the record 1316 in the route management table 131 (FIG. 13C). As shown in the record 1316, the connection route related to the record 1316 (FIG. 13C) is clear such that the "connection route" and the "presence or absence of conversion" are blank.

After the control program 161 of the controller unit 15*b* sets the host path definition 163 to the controller unit 15*a* (FIG. 4A) for the controller unit 15*a*, Embodiment 2 is the same as Embodiment 1. That is, the IO to the controller to be upgraded is offloaded to the other controller, the old controller to be upgraded is upgraded, and then the new controller is restarted.

Stop Processing of Old Storage Controller according to Embodiment 2

FIG. 14 is a sequence diagram showing stop processing of an old storage controller according to Embodiment 2.

As compared with the stop processing of the old storage controller according to Embodiment 1 shown in FIG. 7, the stop processing of the old storage controller according to Embodiment 2 is different in that steps S102*a* to S102*g* are executed between step S102 and step S103. Except for the difference, the stop processing of the old storage controller according to Embodiment 2 is the same as the stop processing of the old storage controller according to Embodiment 1.

In step S102*a*, the control program 161 of the controller unit 15*a* starts switching processing of the connection route. Next, in step S102*b*, the control program 161 of the controller unit 15*a* transmits the instruction to switch the connection route to the switching program 121 of the switch unit 11.

Next, in step S102*c*, the switching program 121 of the switch unit 11 executes low-load determination and connection route selection processing. Details of the low-load determination and connection route selection processing will be described later with reference to FIG. 15.

Next, in step S102*d*, the switching program 121 of the switch unit 11 reflects the connection route selected in step S102*c* in the route management table 131 to update the route management table 131. Next, in step S102*e*, the switching program 121 of the switch unit 11 transmits a notification of update completion of the connection route to the control program 161 of the controller unit 15*a*. The notification of update completion of the connection route includes port information selected in step S102*c*.

Next, in step S102f, the control program 161 of the controller unit 15a switches the host path definition based on the notification of update completion of the connection route notified in step S102e, and updates the port management table 171.

Low-Load Determination and Connection Route Selection Processing according to Embodiment 2

Figure 15:
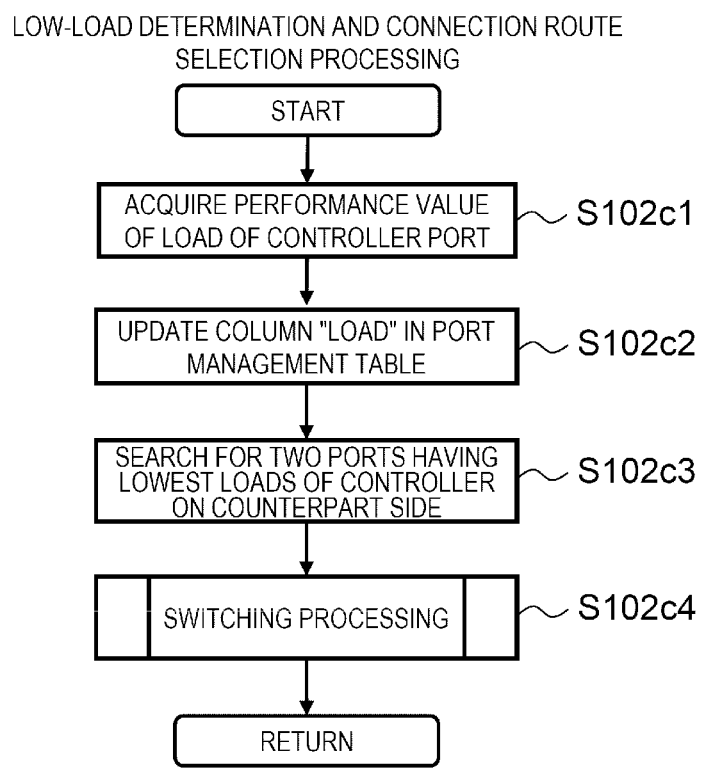
FIG. 15 is a flowchart showing low-load determination and path selection processing according to Embodiment 2.

FIG. 15 is a flowchart showing the low-load determination and connection route selection processing according to Embodiment 2 shown in step S102c in FIG. 14.

First, in step S102c1, the switching program 121 of the switch unit 11 acquires a performance value of a load of the output port 14B (ports #9 to #12) (controller port) connected to the controller unit 15a on the counterpart side. The switching program 121 acquires, for example, as the performance value of the load, a communication amount per unit time of each controller port, which is constantly acquired and accumulated by the switch unit 11.

Next, in step S102c2, the switching program 121 of the switch unit 11 updates the column "load" in the port management table 171 shared by the controller units 15a and 15b with the performance value of the load of the controller port acquired in step S102c1.

Next, in step S102c3, with reference to the port management table 171, the switching program 121 of the switch unit 11 selects two ports having the lowest load among the plurality of ports 19 of the controller on the counterpart side (controller unit 15a).

Next, in step S102c4, the switching program 121 of the switch unit 11 executes the switching processing shown in FIG. 8 on the two ports 19 selected in step S102c3. When the step S102c4 ends, the switching program 121 of the switch unit 11 proceeds the processing to step S102d (FIG. 14).

Activation Processing of New Storage Controller According to Embodiment 2

Figure 16:
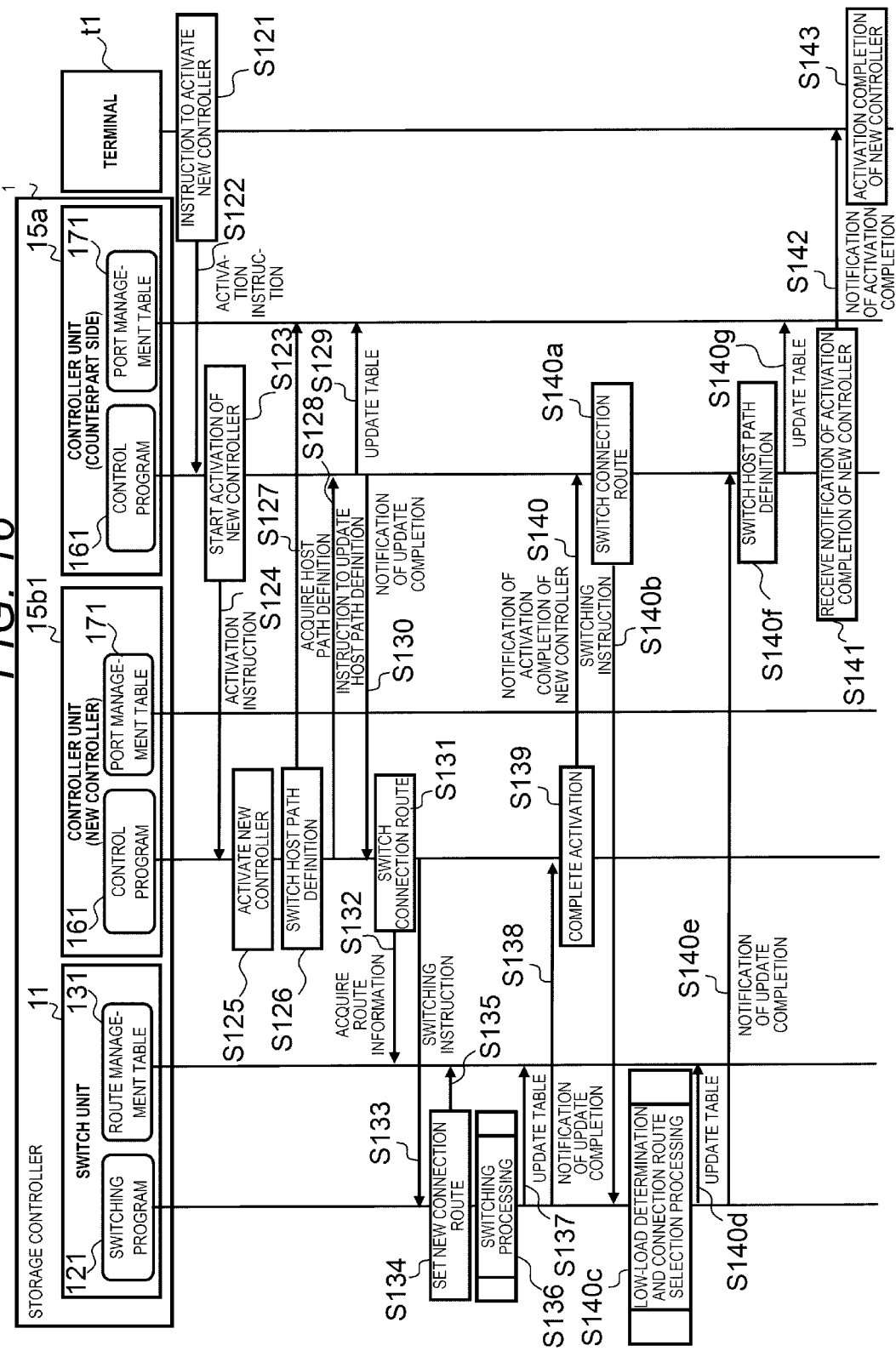
FIG. 16 is a sequence diagram showing activation processing of a new storage controller according to Embodiment 2.

FIG. 16 is a sequence diagram showing activation processing of a new storage controller according to Embodiment 2.

As compared with the activation processing of the new storage controller according to Embodiment 1 shown in FIG. 9, the activation processing of the new storage controller according to Embodiment 2 is different in that steps S140a to S140g are executed between step S140 and step S141. Except for the difference, the stop processing of the new storage controller according to Embodiment 2 is the same as the stop processing of the new storage controller according to Embodiment 1.

In step S140a, the control program 161 of the controller unit 15a starts switching processing of the connection route. Next, in step S140b, the control program 161 of the controller unit 15a transmits the instruction to switch the connection route to the switching program 121 of the switch unit 11.

Next, in step S140c, the switching program 121 of the switch unit 11 executes the low-load determination and connection route selection processing. The low-load determination and connection route selection processing is the same as that in step S102c (FIG. 14) and is as shown in FIG. 15.

In step S140c, instead of selecting two ports 19 having the lowest load, two ports 19 related to the connection route with the "presence of conversion" for the "presence or absence of conversion" in the route management table 131 may be selected. In step S140c, the two ports 19 related to the connection route with the "presence of conversion" for the "presence or absence of conversion" in the route management table 131 are selected, and the subsequent processing is executed, so that the connection route updated in step S102d can be returned to the connection route before the update. For example, as shown in FIGS. 13A and 13C, the connection route of the input port 14A (port #4) to the output port 14B (port #11) is set by the port conversion of WWN #4→WWN #3. The connection route can be restored to the connection route of the input port 14A (port #4) to the output port 14B (port #12) based on the conversion information of WWN #4→WWN #3.

Next, in step S140d, the switching program 121 of the switch unit 11 reflects the connection route selected in step S140c in the route management table 131 to update the route management table 131. Next, in step S140e, the switching program 121 of the switch unit 11 transmits a notification of update completion of the connection route to the control program 161 of the controller unit 15a. The notification of update completion of the connection route includes port information selected in step S140c.

Next, in step S140f, the control program 161 of the controller unit 15a switches the host path definition based on the notification of update completion of the connection route notified in step S140e, and updates the port management table 171.

Effects of Embodiment 2

In Embodiment 2 described above, two ports, that is, the port having the lowest load and the port having the second lowest load, are selected from the ports 19 in the controller unit 15a. The IO input to the first port having the lowest load and the IO input to the second port having the second lowest load among the two ports are aggregated to be input to the second port. That is, a free port is created in one controller unit 15. Second address information is converted to the address information related to the first port as first address information. The first host path definition is set for the free port in the port management table 171 based on the address information related to the first port, and the first connection route is set in the route management table 131 based on the address information related to the first port.

Thus, according to Embodiment 2, a transfer load can be equalized by adjusting the load in the controller unit 15 based on a confirmation result of the IO load of the port to create the free port and selecting the free port of the switch unit 11 to switch the connection route. Since the transfer load is equalized, a transfer and stop time of the controller unit 15 accompanying the upgrading of the controller unit 15 can be shortened, and the work can be quickly performed.

Although the embodiments according to the present disclosure have been described in detail above, the present disclosure is not limited to the embodiments described above, and various modifications can be made without departing from the gist of the present disclosure. For example, the embodiments described above are described in detail for easy understanding of the invention, and the invention is not necessarily limited to those including all the configurations described above. A part of the configuration of each embodiment may be added, deleted, or replaced with other configurations.

Each of the configurations, function units, processing units, processing methods or the like described above may be implemented by hardware by designing a part or all of them with, for example, an integrated circuit. The above configurations, functions, or the like may also be implemented by software by interpreting and executing a program for implementing respective functions by the processor. Information such as a program, a table, and a file for implementing each function may be placed in a recording device such as a memory, an HDD, and an SSD, or a recording medium such as an IC card, an SD card, and a DVD.

The drawings described above show control lines and information lines as considered necessary for description, but do not show all control lines and information lines in the products. For example, it may be considered that almost all the configurations are actually connected to each other.

The function of each system and each device described above and the arrangement form of data are merely examples. The arrangement form of each function and data may be changed to an optimal arrangement form from a viewpoint of the performance of hardware or software, a processing efficiency, a communication efficiency, and the like.

What is claimed is:

1. A storage controller comprising:
    a switch unit configured to receive an IO from a host;
    a first storage control device and a second storage control device configured to process the IO received by the switch unit and to output and receive data to and from a disc device,
    wherein the switch unit includes
        an input port configured to receive the IO from the host, and
        an output port configured to output the IO to a port of the first storage control device and a port of the second storage control device;
    a storage unit that stores
        port management information for managing host path definition information for each of the first storage control device and the second storage control device, the host path definition information indicating a correspondence relation between the host and address information held by the port of a transmission destination to which the host transmits the IO, and
        route management information for managing a connection route for connecting the input port to the output port connected to the port holding the address information in the switch unit to transfer the IO; and
    a processor configured to
        receive an instruction to stop the second storage control device,
        select, from a plurality of ports of the first storage control device, two ports including a first port having a lowest load and a second port having a second lowest load,
        aggregate a first IO input from the first port and a second IO input from the second port such that both the first IO input and the second IO input are input to the second port,
        convert second address information to first address information, the second address information indicating the address information held by the port of the second storage control device, and the first address information indicating the address information related to the first port of the first storage control device,
        set, in the port management information, a first host path definition indicating the host path definition information between the host and the first address information in the first storage control device, in addition to a second host path definition indicating the host path definition information between the host and the second address information in the second storage control device,
        wherein the first host path definition in the port management information is set based on the address information related to the first port,
        set, in the route management information, a first connection route indicating the connection route between the input port and a first output port serving as the output port to which the port holding the first address information is connected, in addition to a second connection route indicating the connection route between the input port and a second output port serving as the output port to which the port holding the second address information is connected,
        wherein the first connection route in the route management information is based on the address information related to the first port, and
        control the switch unit based on the route management information and control the first storage control device and the second storage control device based on the port management information to transfer the IO to the first storage control device or the second storage control device.

2. A storage controller comprising:
    a switch unit configured to receive an IO from a host;
    a first storage control device and a second storage control device configured to process the IO received by the switch unit and to output and receive data to and from a disc device,
    wherein the switch unit includes:
        an input port configured to receive the IO from the host, and
        an output port configured to output the IO to a port of the first storage control device and a port of the second storage control device;
    a storage unit that stores:
        port management information for managing host path definition information for each of the first storage control device and the second storage control device, the host path definition information indicating a correspondence relation between the host and address information held by the port of a transmission destination to which the host transmits the IO, and
        route management information for managing a connection route for connecting the input port to the output port connected to the port holding the address information in the switch unit to transfer the IO; and
    a processor configured to:
        receive an instruction to stop the second storage control device,
        convert second address information to first address information, the second address information indicating the address information held by the port of the second storage control device, and the first address information indicating the address information held by the port of the first storage control device,
        set, in the port management information, a first host path definition indicating the host path definition information between the host and the first address information in the first storage control device, in addition to a second host path definition indicating the host path definition information between the host and the second address information in the second storage control device, set, in the route management information, a first connection route indicating the connection route between the input port and a first output port serving as the output port to which the port holding the first address information is connected, in addition to a second connection route indicating the connection route between the input port and a second output port serving as the output port to which the port holding the second address information is connected, record, in a management table, identification information of the IO that is input to the input port before the first host path definition and the first connection route are set and that is not completely processed by the second storage control device, determine whether the identification information of the IO is recorded in the management table for each IO, output the IO to the second storage control device via the second connection route when the identification information of the IO is recorded in the management table, output the IO to the first storage control device via the first connection route when the identification information of the IO is not recorded in the management table, and control the switch unit based on the route management information and control the first storage control device and the second storage control device based on the port management information to transfer the IO to the first storage control device or the second storage control device.

3. The storage controller according to claim 2, wherein the processor is further configured to:

when the IO whose identification information is recorded in the management table no longer exists delete the second host path definition from the port management information, and delete the second connection route from the route management information.

4. The storage controller according to claim 3, wherein the processor is further configured to:

receive an instruction to activate the second storage control device, restore, in the port management information, the second address information from the first host path definition based on conversion information between the second address information and the first address information, restore, in the route management information, the second connection route from the first connection route based on the conversion information between the second address information and the first address information, and transfer the IO to the first storage control device or the second storage control device according to the port management information and the route management information.

5. The storage controller according to claim 4, wherein the processor is further configured to:

record, in the management table, identification information of the IO that is input to the input port before the second host path definition and the second connection route are restored and that is not completely processed by the first storage control device, determine whether the identification information of the IO is recorded in the management table for each IO, output the IO to the first storage control device via the first connection route when the identification information of the IO is recorded in the management table, and output the IO to the second storage control device via the second connection route when the identification information of the IO is not recorded in the management table.

6. The storage controller according to claim 5, wherein the processor is further configured to:

when the IO whose identification information is recorded in the management table no longer exists delete the first host path definition from the port management information, and delete the first connection route from the route management information.

7. A storage controller control method to be executed by a storage controller, wherein the storage controller includes:

a switch unit configured to receive an IO from a host, a first storage control device and a second storage control device configured to process the IO received by the switch unit and to output and receive data to and from a disc device, a storage unit, and a processor, wherein the switch unit includes an input port configured to receive the IO from the host, and an output port configured to output the IO to a port of the first storage control device and a port of the second storage control device, wherein the storage unit stores port management information for managing host path definition information for each of the first storage control device and the second storage control device, the host path definition information indicating a correspondence relation between the host and address information held by the port of a transmission destination to which the host transmits the IO, and route management information for managing a connection route for connecting the input port to the output port connected to the port holding the address information in the switch unit to transfer the IO, and the storage controller control method comprises:

receiving an instruction to stop the second storage control device;

selecting, from a plurality of ports of the first storage control device, two ports including a first port having a lowest load and a second port having a second lowest load;

aggregating a first IO input from the first port and a second IO input from the second port such that both the first IO input and the second IO input are input to the second port;

converting second address information to first address information, the second address information indicating the address information held by the port of the second storage control device, and the first address information indicating the address information related to the first port of the first storage control device;

setting, in the port management information, a first host path definition indicating the host path definition information between the host and the first address information in the first storage control device, in addition to a second host path definition indicating the host path definition information between the host and the second address information in the second storage control device,
wherein the first host path definition in the port management information is set based on the address information related to the first port;
setting, in the route management information, a first connection route indicating the connection route between the input port and a first output port serving as the output port to which the port holding the first address information is connected, in addition to a second connection route indicating the connection route between the input port and a second output port serving as the output port to which the port holding the second address information is connected,
wherein the first connection route in the route management information is based on the address information related to the first port; and
controlling the switch unit based on the route management information and controlling the first storage control device and the second storage control device based on the port management information to transfer the IO to the first storage control device or the second storage control device.

* * * * *